United States Patent
Goergen et al.

(10) Patent No.: US 11,894,936 B2
(45) Date of Patent: *Feb. 6, 2024

(54) POWER ADAPTER FOR POWER SUPPLY UNIT

(71) Applicant: Cisco Technology, Inc., San Jose, CA (US)

(72) Inventors: Joel Richard Goergen, Soulsbyville, CA (US); Chad M. Jones, Doylestown, OH (US); Jessica Kiefer, San Jose, CA (US); Douglas Paul Arduini, San Ramon, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/848,881

(22) Filed: Jun. 24, 2022

(65) Prior Publication Data
US 2022/0329448 A1 Oct. 13, 2022

Related U.S. Application Data

(63) Continuation of application No. 16/912,563, filed on Jun. 25, 2020, now Pat. No. 11,438,183.
(Continued)

(51) Int. Cl.
*H04L 12/10* (2006.01)
*H04L 12/28* (2006.01)
(Continued)

(52) U.S. Cl.
CPC .............. *H04L 12/10* (2013.01); *G06F 1/20* (2013.01); *G06F 1/266* (2013.01); *H04L 12/2885* (2013.01)

(58) Field of Classification Search
CPC ....... H04L 12/10; H04L 12/2882; G06F 1/20; G06F 1/266
See application file for complete search history.

(56) References Cited

U.S. PATENT DOCUMENTS

| | | |
|---|---|---|
| 3,335,324 A | 8/1967 | Buckeridge |
| 3,962,529 A | 6/1976 | Kubo |

(Continued)

FOREIGN PATENT DOCUMENTS

| | | |
|---|---|---|
| CN | 1209880 C | 7/2005 |
| CN | 201689347 U | 12/2010 |

(Continued)

OTHER PUBLICATIONS

Fischer Connectors SA, "Fiberoptic Cable and Connector Solutions," retrieved from https://www.fischerconnectors.com/us/en/products/fiberoptic, 5 pages.

(Continued)

*Primary Examiner* — Mark A Connolly
(74) *Attorney, Agent, or Firm* — Edell, Shapiro & Finnan, LLC

(57) ABSTRACT

In one embodiment, an apparatus includes a power adapter configured for direct connection to a Power Supply Unit (PSU) installed in a network device, the power adapter comprising a power input port for receiving power on an Ethernet cable, a power converter module for converting the power received at the power input port to a PSU input power, and a power output connector for connection with a PSU power input connector.

24 Claims, 13 Drawing Sheets

Related U.S. Application Data

(60) Provisional application No. 62/981,136, filed on Feb. 25, 2020.

(51) Int. Cl.
  *G06F 1/20* (2006.01)
  *G06F 1/26* (2006.01)

(56) References Cited

U.S. PATENT DOCUMENTS

| | | |
|---|---|---|
| 4,811,187 A | 3/1989 | Nakajima |
| 4,997,388 A | 3/1991 | Dale |
| 5,652,893 A | 7/1997 | Ben-Meir |
| 6,008,631 A | 12/1999 | Johari |
| 6,220,955 B1 | 4/2001 | Posa |
| 6,259,745 B1 | 7/2001 | Chan |
| 6,636,538 B1 | 10/2003 | Stephens |
| 6,685,364 B1 | 2/2004 | Brezina |
| 6,784,790 B1 | 8/2004 | Lester |
| 6,826,368 B1 | 11/2004 | Koren |
| 6,855,881 B2 | 2/2005 | Khoshnood |
| 6,860,004 B2 | 3/2005 | Hirano |
| 7,325,150 B2 | 1/2008 | Lehr |
| 7,420,355 B2 | 9/2008 | Liu |
| 7,490,996 B2 | 2/2009 | Sommer |
| 7,492,059 B2 | 2/2009 | Peker |
| 7,509,505 B2 | 3/2009 | Randall |
| 7,566,987 B2 | 7/2009 | Black et al. |
| 7,583,703 B2 | 9/2009 | Bowser |
| 7,589,435 B2 | 9/2009 | Metsker |
| 7,593,747 B1 | 9/2009 | Karam |
| 7,603,570 B2 | 10/2009 | Schindler |
| 7,616,465 B1 | 11/2009 | Vinciarelli |
| 7,813,646 B2 | 10/2010 | Furey |
| 7,835,389 B2 | 11/2010 | Yu |
| 7,854,634 B2 | 12/2010 | Filipon |
| 7,881,072 B2 | 2/2011 | DiBene |
| 7,915,761 B1 | 3/2011 | Jones |
| 7,921,307 B2 | 4/2011 | Karam |
| 7,924,579 B2 | 4/2011 | Arduini |
| 7,940,787 B2 | 5/2011 | Karam |
| 7,973,538 B2 | 7/2011 | Karam |
| 8,020,043 B2 | 9/2011 | Karam |
| 8,037,324 B2 | 10/2011 | Hussain |
| 8,068,937 B2 | 11/2011 | Eaves |
| 8,081,589 B1 | 12/2011 | Gilbrech |
| 8,184,525 B2 | 5/2012 | Karam |
| 8,276,397 B1 | 10/2012 | Carlson |
| 8,279,883 B2 | 10/2012 | Diab |
| 8,310,089 B2 | 11/2012 | Schindler |
| 8,319,627 B2 | 11/2012 | Chan |
| 8,345,439 B1 | 1/2013 | Goergen |
| 8,350,538 B2 | 1/2013 | Cuk |
| 8,358,893 B1 | 1/2013 | Sanderson |
| 8,386,820 B2 | 2/2013 | Diab |
| 8,638,008 B2 | 1/2014 | Baldwin et al. |
| 8,700,923 B2 | 4/2014 | Fung |
| 8,712,324 B2 | 4/2014 | Corbridge |
| 8,750,710 B1 | 6/2014 | Hirt |
| 8,768,528 B2 | 7/2014 | Millar et al. |
| 8,781,637 B2 | 7/2014 | Eaves |
| 8,787,775 B2 | 7/2014 | Earnshaw |
| 8,829,917 B1 | 9/2014 | Lo |
| 8,836,228 B2 | 9/2014 | Xu |
| 8,842,430 B2 | 9/2014 | Hellriegel |
| 8,849,471 B2 | 9/2014 | Daniel |
| 8,966,747 B2 | 3/2015 | Vinciarelli |
| 9,019,895 B2 | 4/2015 | Li |
| 9,024,473 B2 | 5/2015 | Huff |
| 9,184,795 B2 | 11/2015 | Eaves |
| 9,189,036 B2 | 11/2015 | Ghoshal |
| 9,189,043 B2 | 11/2015 | Vorenkamp |
| 9,273,906 B2 | 3/2016 | Goth |
| 9,319,101 B2 | 4/2016 | Lontka |
| 9,321,362 B2 | 4/2016 | Woo |
| 9,373,963 B2 | 6/2016 | Kuznelsov |
| 9,419,436 B2 | 8/2016 | Eaves |
| 9,484,771 B2 | 11/2016 | Braylovskiy |
| 9,510,479 B2 | 11/2016 | Vos |
| 9,531,551 B2 | 12/2016 | Balasubramanian |
| 9,590,811 B2 | 3/2017 | Hunter, Jr. |
| 9,618,714 B2 | 4/2017 | Murray |
| 9,640,998 B2 | 5/2017 | Dawson |
| 9,665,148 B2 | 5/2017 | Hamdi |
| 9,693,244 B2 | 6/2017 | Maruhashi |
| 9,734,940 B1 | 8/2017 | McNutt |
| 9,853,689 B2 | 12/2017 | Eaves |
| 9,874,930 B2 | 1/2018 | Vavilala |
| 9,882,656 B2 | 1/2018 | Sipes, Jr. |
| 9,893,521 B2 | 2/2018 | Lowe |
| 9,948,198 B2 | 4/2018 | Imai |
| 9,979,370 B2 | 5/2018 | Xu |
| 9,985,600 B2 | 5/2018 | Xu |
| 10,007,628 B2 | 6/2018 | Pitigoi-Aron |
| 10,028,417 B2 | 7/2018 | Schmidtke |
| 10,128,764 B1 | 11/2018 | Vinciarelli |
| 10,248,178 B2 | 4/2019 | Brooks |
| 10,263,526 B2 | 4/2019 | Sandusky et al. |
| 10,281,513 B1 | 5/2019 | Goergen |
| 10,407,995 B2 | 9/2019 | Moeny |
| 10,439,432 B2 | 10/2019 | Eckhardt |
| 10,468,879 B2 | 11/2019 | Eaves |
| 10,541,543 B2 | 1/2020 | Eaves |
| 10,541,758 B2 | 1/2020 | Goergen |
| 10,631,443 B2 | 4/2020 | Byers |
| 10,672,537 B2 | 6/2020 | Goergen |
| 10,680,836 B1 | 6/2020 | Sironi |
| 10,714,930 B1 | 7/2020 | Weiss et al. |
| 10,732,688 B2 | 8/2020 | Goergen |
| 10,735,105 B2 | 8/2020 | Goergen et al. |
| 10,763,749 B2 | 9/2020 | Arduini |
| 10,809,134 B2 | 10/2020 | Bullock |
| 10,958,471 B2 | 3/2021 | Goergen |
| 2001/0024373 A1 | 9/2001 | Cuk |
| 2002/0126967 A1 | 9/2002 | Panak |
| 2004/0000816 A1 | 1/2004 | Khoshnood |
| 2004/0033076 A1 | 2/2004 | Song |
| 2004/0043651 A1 | 3/2004 | Bain |
| 2004/0073703 A1 | 4/2004 | Boucher |
| 2004/0264214 A1 | 12/2004 | Xu |
| 2005/0197018 A1 | 9/2005 | Lord |
| 2005/0268120 A1 | 12/2005 | Schindler |
| 2006/0202109 A1 | 9/2006 | Delcher |
| 2006/0209875 A1 | 9/2006 | Lum |
| 2007/0103168 A1 | 5/2007 | Batten |
| 2007/0143508 A1 | 6/2007 | Linnman |
| 2007/0236853 A1 | 10/2007 | Crawley |
| 2007/0263675 A1 | 11/2007 | Lum |
| 2007/0284946 A1 | 12/2007 | Robbins |
| 2007/0288125 A1 | 12/2007 | Quaratiello |
| 2008/0054720 A1 | 3/2008 | Lum |
| 2008/0198635 A1 | 8/2008 | Hussain |
| 2008/0229120 A1 | 9/2008 | Diab |
| 2008/0310067 A1 | 12/2008 | Diab |
| 2009/0027033 A1 | 1/2009 | Diab |
| 2009/0228722 A1 | 9/2009 | Lin |
| 2010/0077239 A1 | 3/2010 | Diab |
| 2010/0117808 A1 | 5/2010 | Karam |
| 2010/0171602 A1 | 7/2010 | Kabbara |
| 2010/0190384 A1 | 7/2010 | Lanni |
| 2010/0237846 A1 | 9/2010 | Vetteth |
| 2010/0290190 A1 | 11/2010 | Chester |
| 2011/0004773 A1 | 1/2011 | Hussain |
| 2011/0007664 A1 | 1/2011 | Diab |
| 2011/0057612 A1 | 3/2011 | Taguchi |
| 2011/0083824 A1 | 4/2011 | Rogers |
| 2011/0228578 A1 | 9/2011 | Serpa |
| 2011/0266867 A1 | 12/2011 | Schindler |
| 2011/0290497 A1 | 12/2011 | Stenevik |
| 2012/0043935 A1 | 2/2012 | Dyer |
| 2012/0064745 A1 | 3/2012 | Ottliczky |
| 2012/0170927 A1 | 7/2012 | Huang |
| 2012/0201089 A1 | 8/2012 | Barth |
| 2012/0231654 A1 | 9/2012 | Conrad |

(56) References Cited

U.S. PATENT DOCUMENTS

| | | |
|---|---|---|
| 2012/0287984 A1 | 11/2012 | Lee |
| 2012/0317426 A1 | 12/2012 | Hunter, Jr. |
| 2012/0319468 A1 | 12/2012 | Schneider |
| 2013/0077923 A1 | 3/2013 | Weem |
| 2013/0079633 A1 | 3/2013 | Weem |
| 2013/0103220 A1 | 4/2013 | Eaves |
| 2013/0249292 A1 | 9/2013 | Blackwell, Jr. |
| 2013/0272721 A1 | 10/2013 | Van Veen |
| 2013/0329344 A1 | 12/2013 | Tucker |
| 2014/0111180 A1 | 4/2014 | Vladan |
| 2014/0126151 A1 | 5/2014 | Campbell |
| 2014/0129850 A1 | 5/2014 | Paul |
| 2014/0258742 A1 | 9/2014 | Chien |
| 2014/0258813 A1 | 9/2014 | Lusted |
| 2014/0265550 A1 | 9/2014 | Milligan |
| 2014/0372773 A1 | 12/2014 | Heath |
| 2015/0078740 A1 | 3/2015 | Sipes, Jr. |
| 2015/0106539 A1 | 4/2015 | Leinonen |
| 2015/0115741 A1 | 4/2015 | Dawson |
| 2015/0207317 A1 | 7/2015 | Radermacher |
| 2015/0215001 A1 | 7/2015 | Eaves |
| 2015/0215131 A1 | 7/2015 | Paul |
| 2015/0333918 A1 | 11/2015 | White, III |
| 2015/0340818 A1 | 11/2015 | Scherer |
| 2015/0365003 A1 | 12/2015 | Sadwick |
| 2016/0018252 A1 | 1/2016 | Hanson |
| 2016/0020858 A1 | 1/2016 | Sipes, Jr. |
| 2016/0020911 A1 | 1/2016 | Sipes, Jr. |
| 2016/0028324 A1 | 1/2016 | Weatherspoon |
| 2016/0064938 A1 | 3/2016 | Balasubramanian |
| 2016/0064939 A1 | 3/2016 | Lai |
| 2016/0111877 A1 | 4/2016 | Eaves |
| 2016/0118784 A1 | 4/2016 | Saxena |
| 2016/0133355 A1 | 5/2016 | Glew |
| 2016/0134331 A1 | 5/2016 | Eaves |
| 2016/0142217 A1 | 5/2016 | Gardner |
| 2016/0164432 A1 | 6/2016 | Weatherspoon |
| 2016/0188427 A1 | 6/2016 | Chandrashekar |
| 2016/0197600 A1 | 7/2016 | Kuznetsov |
| 2016/0365967 A1 | 7/2016 | Tu |
| 2016/0241148 A1 | 8/2016 | Kizilyalli |
| 2016/0262288 A1 | 9/2016 | Chainer |
| 2016/0273722 A1 | 9/2016 | Crenshaw |
| 2016/0294500 A1 | 10/2016 | Chawgo |
| 2016/0294568 A1 | 10/2016 | Chawgo et al. |
| 2016/0308683 A1 | 10/2016 | Pischl |
| 2016/0352535 A1 | 12/2016 | Hiscock |
| 2016/0370835 A1 | 12/2016 | Erickson et al. |
| 2017/0041152 A1 | 2/2017 | Sheffield |
| 2017/0041153 A1 | 2/2017 | Picard |
| 2017/0054296 A1 | 2/2017 | Daniel |
| 2017/0110871 A1 | 4/2017 | Foster |
| 2017/0123466 A1 | 5/2017 | Carnevale |
| 2017/0146260 A1 | 5/2017 | Ribbich |
| 2017/0155517 A1 | 6/2017 | Cao |
| 2017/0164525 A1 | 6/2017 | Chapel |
| 2017/0155518 A1 | 7/2017 | Yang |
| 2017/0214236 A1 | 7/2017 | Eaves |
| 2017/0229886 A1 | 8/2017 | Eaves |
| 2017/0234738 A1 | 8/2017 | Ross |
| 2017/0244318 A1 | 8/2017 | Giuliano |
| 2017/0248976 A1 | 8/2017 | Moller |
| 2017/0294966 A1 | 10/2017 | Jia |
| 2017/0325320 A1 | 11/2017 | Wendt |
| 2018/0024964 A1 | 1/2018 | Mao |
| 2018/0053313 A1 | 2/2018 | Smith |
| 2018/0054083 A1 | 2/2018 | Hick |
| 2018/0060269 A1 | 3/2018 | Kessler |
| 2018/0088648 A1 | 3/2018 | Otani |
| 2018/0098201 A1 | 4/2018 | Torello |
| 2018/0102604 A1 | 4/2018 | Keith |
| 2018/0123360 A1 | 5/2018 | Eaves |
| 2018/0159430 A1 | 6/2018 | Albert |
| 2018/0188712 A1 | 7/2018 | MacKay |
| 2018/0191513 A1 | 7/2018 | Hess |
| 2018/0254624 A1 | 9/2018 | Son |
| 2018/0313886 A1 | 11/2018 | Mlyniec |
| 2018/0340840 A1 | 11/2018 | Bullock |
| 2019/0064890 A1 | 2/2019 | Donachy |
| 2019/0089467 A1 | 3/2019 | Goergen et al. |
| 2019/0124262 A1 | 4/2019 | El Kolli et al. |
| 2019/0126764 A1 | 5/2019 | Fuhrer |
| 2019/0267804 A1 | 8/2019 | Matan |
| 2019/0272011 A1 | 9/2019 | Goergen |
| 2019/0277899 A1 | 9/2019 | Goergen |
| 2019/0277900 A1 | 9/2019 | Goergen |
| 2019/0278347 A1 | 9/2019 | Goergen |
| 2019/0280895 A1 | 9/2019 | Mather |
| 2019/0304630 A1 | 10/2019 | Goergen |
| 2019/0312751 A1 | 10/2019 | Goergen |
| 2019/0342011 A1 | 10/2019 | Goergen |
| 2019/0363493 A1 | 11/2019 | Sironi |
| 2020/0044751 A1 | 2/2020 | Goergen |
| 2020/0233472 A1 | 7/2020 | Jones et al. |
| 2020/0371572 A1 | 11/2020 | Plank et al. |
| 2022/0190587 A1 | 6/2022 | Eaves et al. |

FOREIGN PATENT DOCUMENTS

| | | |
|---|---|---|
| CN | 204836199 U | 12/2015 |
| CN | 105549709 A | 5/2016 |
| CN | 205544597 | 8/2016 |
| CN | 104081237 B | 10/2016 |
| CN | 107005003 A | 8/2017 |
| CN | 103490907 B | 12/2017 |
| CN | 104412541 B | 5/2019 |
| EP | 1936861 | 6/2008 |
| EP | 2120443 | 11/2009 |
| EP | 2257009 A2 | 1/2010 |
| EP | 2432134 A1 | 3/2012 |
| EP | P2693688 | 2/2014 |
| JP | H1173247 A | 3/1999 |
| JP | 2009260563 A | 11/2009 |
| JP | 2015042078 A | 3/2015 |
| WO | WO199316407 A1 | 8/1993 |
| WO | WO2006127916 A2 | 11/2006 |
| WO | WO2010053542 | 5/2010 |
| WO | WO2017054030 | 4/2017 |
| WO | WO2017167926 A1 | 10/2017 |
| WO | WO2018117544 A1 | 1/2018 |
| WO | WO2019023731 A1 | 2/2019 |
| WO | WO2019212759 A1 | 11/2019 |

OTHER PUBLICATIONS

STRAN Technologies, http://www.strantech.com/products/tfoca-genx-hybrid-2x2-fiber-optic-copper-connector/, Dec. 2017, 2 pages.

QPC Engineered Fiber Optic Soloutions, http://www.qpcfiber.com/product/connectors/e-link-hybrid-connector/ retrieved Dec. 21, 2017, 4 pages.

Lumentum, https://www.lumentum.com/sites/default/files/technical-library-items/poweroverfiber-tn-pv-ae_0.pdf, retrieved on Sep. 25, 2020, 8 pages.

Eaves et al. "Network Remote Power Using Packet Energy Transfer", www.voltserver.com, Sep. 2012, 4 pages.

Product Overview, "Pluribus VirtualWire Solution", Pluribus Networks, PN-PO-VWS-05818, https://www.pluribusnetworks.com/assets/Pluribus-VirtualWire-PO-50918.pdf, May 2018, 5 pages.

Juniper Networks, Implementation Guide, "Virtual Chassis Technology Best Practices," 8010018-009-EN, Jan. 2016, https://wwwjuniper.net/us/en/local/pdf/implementation-guides/8010018-en.pdf, 29 pages.

Yencheck, "Thermal Modeling of Portable Power Cables," Jan. 1993, 19 pages.

Zhang, Machine Learning-Based Temperature Prediction for Runtime Thermal Management across System Components, Mar. 2016, 15 pages.

Rabe, et al. "Data Center Power Equipment Thermal Guidelines and Best Practices," ASHRAE Technical Committee 9.9 Mission Critical Facilities, Data Centers, Technology Spaces, and Electronic Equipment, Jun. 2016, 60 pages.

(56) References Cited

OTHER PUBLICATIONS

Adapa, R. "Dynamic Thermal Rating of Substation Terminal Equipment," Jan. 2004, 8 pages.
Chen, Real-Time Termperature Estimation for Power MOSEFETs Conidering Thermal Aging Effects:, IEEE Trnasactions on Device and Materials Reliability, vol. 14, No. 1, Mar. 2014, 9 pages.
Jingquan Chen et al: "Buck-boost PWM converters having two independently controlled switches", 32nd Annual IEEE Power Electronics Specialists Conference. PESC 2001. Conference Proceedings, Vancouver, Canada, Jun. 17-21, 2001; [Annual Power Electronics Specialists Conference], New York, NY: IEEE, US, vol. 2, Jun. 17, 2001 (Jun. 17, 2001), pp. 736-741, XP010559317, DOI: 10.1109/PESC.2001.954206, ISBN 978-0-7803-7067-8 paragraph [SectionII]; figure 3.
Cheng K W E et al: "Constant Frequency, Two-Stage Quasiresonant Convertor", IEE Proceedings B. Electrical Power Applications, 1271980 1, vol. 139, No. 3, May 1, 1992 (May 1, 1992), pp. 227-237, XP000292493, the whole document.
Goergen, et al. Petition for Post Grant Review of U.S. Pat. No. 10,735,105 [Public], filed Feb. 16, 2021, PGR 2021-00055, 28 pages.
Goergen, et al. Petition for Post Grant Review of U.S. Pat. No. 10,735,105 [Public], filed Feb. 16, 2021, PGR 2021-00056, 132 pages.
Eaves, S. S., "Network Remote Powering Using Packet Energy Transfer, Proceedings of IEEE International Conference on Telecommunications Energy (INTELEC) 2012, Scottsdale, AZ, Sep. 30-Oct. 4, 2012 (IEEE 2012) ("EavesIEEE), 4 pages.
Edelstein S., Updated 2016 Tesla Model S also gets new 75-kWhbattery option, (Jun. 19, 2016), archived Jun. 19, 2016 by Internet Archive Wayback machine at https://web.archive.org/web/20160619001148/https://www.greencarreports.com/news/1103 782_updated-2016-tesla-model-s-also-gets-new-7 5-kwh-battery-option ("Edelstein"), 3 pages.
NFPA 70, "National Electrical Code," retrieved Dec. 2017, Edition (NEC), 881 pages.
International Standard IEC 62368-1 Edition 2.0 (Feb. 2014), ISBN 978-2-8322-1405-3 ("IEC-62368"), 680 pages.
International Standard IEC/TS 60479-1 Edition 4.0 (Jul. 2005), ISBN 2-8318-8096-3 ("IEC-60479"), 122 pages.
International Standard IEC 60950-1 Edition 2.2 (May 2013), ISBN 978-2-8322-0820-5 ("IEC-60950"), 648 pages.
International Standard IEC 60947-1 Edition 5.0 (Sep. 2014), ISBN 978-2-8322-1798-6 ("IEC-60947"), 106 pages.
Tanenbaum, A. S., "Computer Networks," Third Edition, Mar. 6, 1996, 12 pages.
Stallings, W., Data and Computer Communications, Fourth Edition, published Jan. 1, 1994. ("Stallings"), 14 pages.
Alexander, C. K., Fundamentals of Electric Circuits, Indian Edition (Jul. 2013) ("Alexander"), 37 pages.
Hall, S. H., High-Speed Digital System Design, A Handbook of Interconnect Theory and Design Practices, Aug. 25, 2000. ("Hall"), 55 pages.
Sedra, A. S., Microelectronic Circuits, Seventh Edition, Nov. 14, 2014. ("Sedra"), 38 pages.
Lathi, B. P., Modem Digital and Analog Communication Systems, Fourth Edition Jan. 23, 2009 ("Lathi"), 15 pages.
Understanding 802.3at PoE Plus Standard Increases Available Power (Jun. 2011) ("Microsemi"), 7 pages.
*Voltserver Inc.*, v. *Cisco Technology, Inc.*, "Decision Denying Institution of Post-Grant Review," United States Patent and Trademark Office, PGR2021-00055, U.S. Pat. No. 10,735,105 B2, Aug. 19, 2021, 25 pages.
*Voltserver Inc.*, v. *Cisco Systems, Inc.*, "Patent Owner's Preliminary Response to Post Grant Review Under 35 U.S.C. § 312 and 37 C.F.R. § 42.107," United States Patent and Trademark Office, PGR2021-00055, U.S. Pat. No. 10,735,105, 2021, Jun. 2, 2021, 51 pages.

"Effects of current on human beings and livestok—Part 1: General aspects," Technical Specification, Basic Safety Publication, IEC/TS 60479-1, Edition 4.0, Jul. 2005, 122 pages.
"Information technology equipment—Safety—Part 1: General requirements," International Standard, IEC 60950-1, Edition 2.2, May 2013, pp. 1-61, 63 pages.
"Information technology equipment—Safety—Part 1: General requirements," International Standard, IEC 60950-1, dition 2.2, May 2013, pp. 62-122, 61 pages.
"Information technology equipment—Safety—Part 1: General requirements," International Standard, IEC 60950-1, Edition 2.2, May 2013, pp. 123-181, 59 pages.
"Information technology equipment—Safety—Part 1: General requirements," International Standard, IEC 60950-1, Edition 2.2, May 2013, pp. 182-253, 72 pages.
"Information technology equipment—Safety—Part 1: General requirements," International Standard, IEC 60950-1, Edition 2.2, May 2013, pp. 254-319, 66 pages.
"Information technology equipment—Safety—Part 1: General requirements," International Standard, IEC 60950-1, Edition 2.2, May 2013, pp. 320-377, 58 pages.
"Information technology equipment—Safety—Part 1: General requirements," International Standard, IEC 60950-1, Edition 2.2, May 2013, pp. 378-433, 56 pages.
"Information technology equipment—Safety—Part 1: General requirements," International Standard, IEC 60950-1, Edition 2.2, May 2013, pp. 434-490, 57 pages.
"Information technology equipment—Safety—Part 1: General requirements," International Standard, IEC 60950-1, Edition 2.2, May 2013, pp. 491-551, 61 pages.
"Information technology equipment—Safety—Part 1: General requirements," International Standard, IEC 60950-1, Edition 2.2, May 2013, pp. 552-622, 71 pages.
"Information technology equipment—Safety—Part 1: General requirements," International Standard, IEC 60950-1, Edition 2.2, May 2013, pp. 623-644, 24 pages.
"Low-voltage switchgear and controlgear—Part 1: General rules," International Standard, Amendment 2, IEC 60947-1, Edition 5.0, Sep. 2014, pp. 1-63, 65 pages.
"Low-voltage switchgear and controlgear—Part 1: General rules," International Standard, Amendment 2, IEC 60947-1, dition 5.0, Sep. 2014, pp. 64-102, 41 pages.
Stephen Edelstein, "Updated 2016 Tesla Model S also gets new 75-kWhbattery option," Internet Archive WayBack Machine, Green Car Reports, May 5, 2016, 3 pages.
Stephen S. Eaves, "Network Remote Powering using Packet Energy Transfer," IEEE Xplore, Proceedings of IEEE International Conference on Telecommunications Energy (INTELEC) 2012, 978-1-4673-1000, Sep. 30-Oct. 4, 2012, 4 pages.
"Audio/video, information and communication technology equipment—Part 1: Safety requirements," International Standard, IEC 62368-1, Edition 2.0, Feb. 2014, pp. 1-132, 134 pages.
"Audio/video, information and communication technology equipment—Part 1: Safety requirements," International Standard, IEC 62368-1, Edition 2.0, Feb. 2014, pp. 133-263, 131 pages.
"Audio/video, information and communication technology equipment—Part 1: Safety requirements," International Standard, IEC 62368-1, Edition 2.0, Feb. 2014, pp. 264-387, 124 pages.
"Audio/video, information and communication technology equipment—Part 1: Safety requirements," International Standard, IEC 62368-1, Edition 2.0, Feb. 2014, pp. 388-508, 121 pages.
"Audio/video, information and communication technology equipment—Part 1: Safety requirements," International Standard, IEC 62368-1, Edition 2.0, Feb. 2014, pp. 509-593, 85 pages.
"Audio/video, information and communication technology equipment—Part 1: Safety requirements," International Standard, IEC 62368-1, Edition 2.0, Feb. 2014, pp. 594-676, 85 pages.
"National Electrical Code," National Fire Protection Association (NFPA) 70, 2017, 881 pages.
*Voltserver Inc.*, v. *Cisco Technology, Inc.*, "Declaration of David A. Durfee, Ph.D.," United States Patent and Trademark Office, PGR2021-00055, U.S. Pat. No. 10,735,105, Feb. 16, 2021, 340 pages.
David A. Durfee Ph.D., "Curriculum Vitae," 4 pages.

(56) References Cited

OTHER PUBLICATIONS

Adel S. Sedra, "Microelectronic Circuits," Sedra/Smith, Oxford University Press, Seventh Edition, 2015, 38 pages.
Charles k. Alexander, et al., "Fundamentals of Electric Circuits," McGraw Hill Education, Indian Edition 5e, 2013, 37 pages.
Andrew S. Tanenbaum, "Computer Networks," Prentice Hall PTR, Third Edition, 1996, 12 pages.
William Stallings, "Data and Computer Communications," Macmillan Publishing Company, Fourth Edition, 1994, 14 pages.
B.P. Lathi, et al., "Modern Digital and Analog Communication Systems," Oxford University Press, Fourth Edition, 2009, 15 pages.
*Voltserver Inc.*, v. *Cisco Technology, Inc.*, "Petition for Post Grant Review of U.S. Pat. No. 10,735,105," United States Patent and Trademark Office, PGR2021-00055, U.S. Pat. No. 10,735,105, Feb. 16, 2021, 132 pages.
Stephen H. Hall, et al., "High-Speed Digital System Design: A handbook of Interconnect Theory and Design Practices,", John Wiley & Sons, Inc., 2000, 55 pages.
"Understanding 802.3at, PoE Plus Standard Increases Available Power," Microsemi, Jun. 2011, 7 pages.
"Digital Electricity Gen2 Detailed Installation Manual," Voltserver Digital Electricity, Rev B.1, Nov. 29, 2017, 68 pages.
Berkeley Lab ETA, "Touch-Safe, High Voltage Digital Electricity Transmission using Packet Energy Transfer," Vimeo, https://vimeo.com/172469008, Mar. 8, 2016, 8 pages.
*Voltserver Inc.*, v. *Cisco Technology, Inc.*, "Decision Denying Institution of Post-Grant Review," United States Patent and Trademark Office, PGR2021-00056, U.S. Pat. No. 10,735,105 B2, Aug. 23, 2021, 18 pages.
*Voltserver Inc.*, v. *Cisco Systems, Inc.*, "Patent Owner's Preliminary Response to Post Grant Review Under 35 U.S.C. § 312 and 37 C.F.R. § 42.107," United States Patent and Trademark Office, PGR2021-00056, U.S. Pat. No. 10,735,105, 2021, Jun. 2, 2021, 46 pages.
*Voltserver Inc.*, v. *Cisco Technology, Inc.*, "Declaration of Stephens S. Eaves," United States Patent and Trademark Office, PGR2021-00056, U.S. Pat. No. 10,735,105, Feb. 16, 2021, 7 pages.
"Electrical—Computer Conference Proceedings," Internet Archive WayBack Machine Search for Intelec 2012, Curran Associates, Inc., http://www.proceedings.com/electrical-computer-proceedings.html, 2012, 125 pages.
"Part VII: A Summary of Commonly Used MARC 21 Fields," Marc, Understanding MARC, https://www.loc.gov/marc//umb/um07to10.html, retrieved from Internet Feb. 13, 2021, 17 pages.
LC Catalog-Browse, https://catalog.loc.gov/vwebv/searchBrowse, retrieved from the Internet Feb. 12, 2021, 1 page.
"International Telecommunications Energy Conference: [proceedings] (Marc Tags)," Library Catalog, https://catalog.loc.gov/vwebv/staffView?searchId=3877&recPointer=0&recCount=25&searchType=1&bibId=11348322, retrieved from the Internet Feb. 12, 2021, 3 pages.
*Voltserver Inc.*, v. *Cisco Technology, Inc.*, "Petition for Post Grant Review of U.S. Pat. No. 10,735,105," United States Patent and Trademark Office, PGR2021-00056, U.S. Pat. No. 10,735,105, Feb. 16, 2021, 116 pages.
"International Telecommunications Energy Conference: [proceedings] (Full Record)," Library Catalog, https://catalog.loc.gov/vwebv/holdingsInfo?searchId=3810&recPointer=0&recCount=25&searchType=1&bibId=11348322, retrieved from the Internet Feb. 12, 2021, 4 pages.
English Translation of Office Action in counterpart Japanese Application No. 2022-547035, dated Aug. 30, 2023, 06 pages.
International Search Report and Written Opinion for International Application No. PCT/US2021/017505, dated May 17, 2021, 10 Pages.
English Translation of Office Action in counterpart Chinese Application No. 202180016243.2, dated Sep. 26, 2023, 36 pages.

POWER ADAPTER FOR POWER SUPPLY UNIT

STATEMENT OF RELATED APPLICATION

The present application is a continuation of U.S. application Ser. No. 16/912,563, filed Jun. 25, 2020, which in turn claims priority from U.S. Provisional Application No. 62/981,136, entitled METHOD AND APPARATUS FOR CONVERTING POWER SUPPLY UNIT BASED SYSTEM TO FAULT MANAGED POWER BASED SYSTEM, filed on Feb. 25, 2020. The contents of this provisional application are incorporated herein by reference in its entirety.

TECHNICAL FIELD

The present disclosure relates generally to power systems for network communications devices, and more particularly, to a power adapter for a power supply unit at the network communications device.

BACKGROUND

There are a large number of network devices currently in use or being sold with conventional power supply units that accept utility or green energy power such as 208 VAC or 380 VDC. It can be costly to change these power supply units to operate with different power inputs.

BRIEF DESCRIPTION OF THE FIGURES

Corresponding reference characters indicate corresponding parts throughout the several views of the drawings.

DESCRIPTION OF EXAMPLE EMBODIMENTS

Overview

Figure 1:
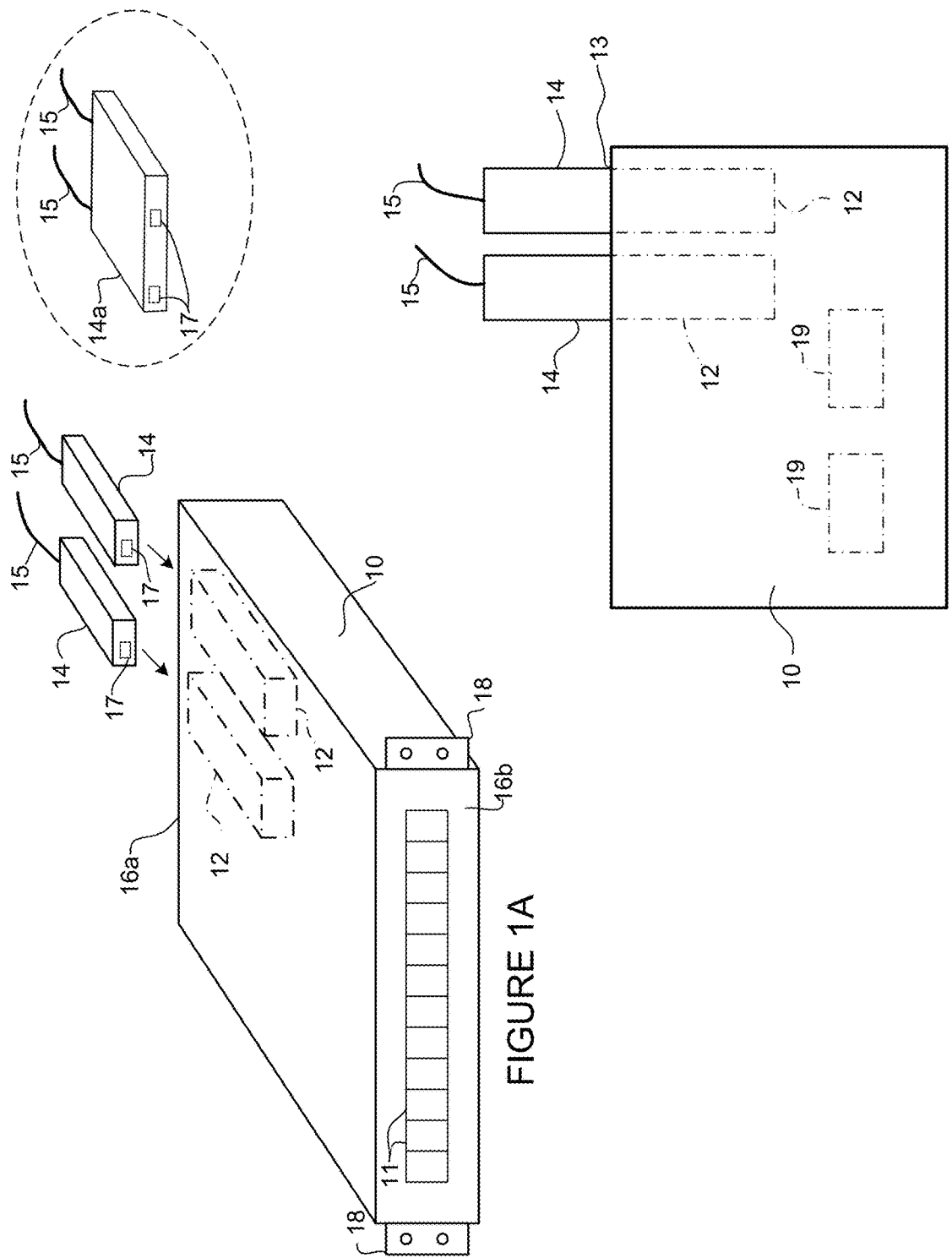
FIG. 1A is a perspective of a network device with two power adapters aligned for connection with two Power Supply Units (PSUs), in accordance with one embodiment.
FIG. 1B is a top view of the network device shown in FIG. 1A with the power adapters coupled to the PSUs.

In one embodiment, an apparatus generally comprises a power adapter configured for direct connection to a Power Supply Unit (PSU) installed in a network device, the power adapter comprising a power input port for receiving power on an Ethernet cable, a power converter module for converting the power received at the power input port to a PSU input power, and a power output connector for connection with a PSU power input connector.

In another embodiment, an apparatus generally comprises a PSU comprising a power input connector operable to receive a PSU input power and power network device components when installed in a network device, and a power adapter coupled to the PSU and comprising a power input port for receiving power on an Ethernet cable, a power converter module for converting the power received at the power input port to the PSU input power, and a power output connector connected to the power input connector of the PSU.

In another embodiment, a network device generally comprises a PSU comprising a power input connector operable to receive a PSU input power and power one or more components of the network device, and a power adapter coupled to the PSU and comprising a power input port for receiving DC (Direct Current) pulse power, a power converter module for converting the DC pulse power to the PSU input power, and a power output connector connected to the power input connector of the PSU.

In another embodiment, an apparatus generally comprises an input port for receiving power and data on a cable, a power converter module for converting the power received at the power input port to a PSU input power, a power output connector for electrical connection with a PSU installed in a network device, and a data output port for transmitting data to the network device.

In another embodiment, an apparatus generally comprises a power adapter configured for powering a PSU installed in a network device, the power adapter comprising a power input port for receiving DC pulse power on a cable, a power converter module for converting the DC pulse power to a PSU input power, and a power output connector for electrical connection with a PSU power input connector.

In yet another embodiment, a power adapter generally comprises a power input port for receiving multi-phase DC pulse power on a cable, a power converter module for converting the multi-phase DC pulse power to a PSU input power, and a power output connector for transmitting the PSU input power to a PSU power input connector located on a PSU installed in a network device.

Further understanding of the features and advantages of the embodiments described herein may be realized by reference to the remaining portions of the specification and the attached drawings.

EXAMPLE EMBODIMENTS

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Power Supply Units (PSUs) may be used to convert AC (Alternating Current) or DC (Direct Current) power to regulated DC power for use by internal components of a network device. The PSU may, for example, support input voltages between 100 VAC (Volts Alternating Current) and 277 VAC or DC (Direct Current) input (e.g., 240 VDC, 380 VDC) using a conventional power cable supplying standard input power. It may be desired, however, to utilize new or different types of power input. For example, users of enterprise switching components for digital building applications may want to use standard components, but also have the flexibility to move to different power based implementations. If a different type of power is supplied (e.g., Fault Managed Power (FMP) described below), it would be costly to change conventional PSUs to operate with different power input and distribution methods.

Embodiments described herein provide a power adapter that directly attaches to a power supply unit thereby providing a power supply module that may operate with power input different than conventional power supply sources. In one or more embodiments, the power supply unit may be permanently converted to an FMP based system.

The embodiments described herein operate in the context of a data communications network including multiple network devices. The network may include any number of network devices in communication via any number of nodes (e.g., routers, switches, gateways, controllers, edge devices, access devices, aggregation devices, core nodes, intermediate nodes, or other network devices), which facilitate passage of data within the network. One or more of the network devices may comprise a power supply unit coupled to a power adapter as described herein to create a power supply module operable to receive fault managed power.

The network may be configured for Power over Ethernet (PoE) (e.g., conventional PoE or PoE+ at a power level <100 watts (W), at a voltage level <57 volts (V), according to IEEE 802.3af, IEEE 802.3at, or IEEE 802.3bt), Power over Fiber (PoF), advanced power over data, FMP, or any other power over communications system in accordance with current or future standards, which may be used to pass electrical power along with data to allow a single cable to provide both data connectivity and electrical power to network devices such as switches, routers, wireless access points, and many other network devices.

The term "Fault Managed Power" (FMP) (also referred to as Extended Safe Power (ESP)) as used herein refers to high power (e.g., >100 W), high voltage (e.g., >60V) operation with pulse power delivered on one or more wires or wire pairs. In one or more embodiments, FMP includes fault detection (e.g., fault detection at initialization and between high voltage pulses), and pulse synchronization between power sourcing equipment (PSE) and a powered device (PD). The power may be transmitted with communications (e.g., bidirectional communications) or without communications.

The term "pulse power" (also referred to as "pulsed power") as used herein refers to power that is delivered in a sequence of pulses (alternating low direct current voltage state and high direct current voltage state) in which the voltage varies between a very small voltage (e.g., close to 0V, 3V) during a pulse-off interval and a larger voltage (e.g., >12V, >24V) during a pulse-on interval. In one or more embodiments, the FMP (or ESP) provides high power (e.g., ≥100 W) at a high voltage (e.g., ≥56V). High voltage pulse power (e.g., ≥56 VDC, ≥60 VDC, ≥300 VDC, —108 VDC, ~380 VDC) may be transmitted from power sourcing equipment to a powered device for use in powering the powered device, as described, for example, in U.S. patent application Ser. No. 16/671,508 ("Initialization and Synchronization for Pulse Power in a Network System"), filed Nov. 1, 2019, which is incorporated herein by reference in its entirety. Pulse power transmission may be through cables, transmission lines, bus bars, backplanes, PCBs (Printed Circuit Boards), and power distribution systems, for example. It is to be understood that the power and voltage levels described herein are only examples and other levels may be used.

In one or more embodiments, FMP may comprise pulse power transmitted in multiple phases in a multi-phase pulse power system with pulses offset from one another between wires or wire pairs to provide continuous power (as described below with respect to FIG. 10). One or more embodiments may, for example, use multi-phase pulse power to achieve less loss, with continuous uninterrupted power with overlapping phase pulses to a powered device, as described in U.S. patent application Ser. No. 16/380,954 ("Multiple Phase Pulse Power in a Network Communications System"), filed Apr. 10, 2019, which is incorporated herein by reference in its entirety. In one or more embodiments, FMP may refer to a combination of ESP (single-phase or multi-phase DC pulse power) and PoE or a power system operable to switch between ESP and PoE.

Referring now to the drawings, and first to FIG. 1A, a network device 10 (e.g., switch, router, or other network device) comprising two PSUs 12 is shown with two power adapters 14 aligned for connection with the PSUs. The power adapter 14 (also referred to as a power receiver or FMP receiver) is configured for receiving power at a cable (e.g., Ethernet cables) 15 and converting the power to provide a standard PSU power input (e.g., 240 VAC, 240 VDC, 380 VDC, or other standard PSU input power) at power output connector 17. The term "Ethernet cable" as used herein may refer to four-pair communications cabling, Single Pair Ethernet (SPE), or any other cable comprising one or more wire pairs.

As described below, single-phase or multi-phase pulse power input may be provided to the power adapter 14 on cable 15. In the example shown in FIG. 1A, two PSUs (e.g., redundant power supply units) 12 are positioned along a rear wall 16a of the network device. The PSU 12 may be a removable module (field replaceable, hot-swappable device) that is received in an opening at the rear of the chassis and configured to provide power (e.g., 48 VDC, 54 VDC, or other regulated voltage) to the network device 10. In one or more embodiments, the power adapter 14 and the PSU 12 are only hot-swappable on the network device 10 in a coupled configuration.

The power adapters may also be combined into a single unit or power adapter strip 14*a* with multiple power connectors 17 for providing power connections to multiple PSUs 12, as shown in cutout view of FIG. 1A.

As shown in the top view of FIG. 1B, the power adapters 14 are coupled to the PSUs 12 to provide power input to the PSUs, thereby eliminating the need for a separate power cord without any modification to the PSU. The power adapters 14 are coupled to the PSUs 12 at interface 13 through a power connection (power output connector 17 and power input connector at PSU) and one or more structural attachment points (e.g., snaps, clips, fasteners, connectors), as described below. The PSU 12 may power one or more network device components 19 (e.g., processor, ASIC (Application Specific Integrated Circuit), fan, controller). In one example, power received at a power input port of the power adapter 14 comprises DC power and the PSU input power comprises AC power, with the PSU operable to deliver regulated DC power for powering the network device 10. The power adapter 14 may be configured to provide 1100 W to the PSU 12, for example.

Referring again to FIG. 1A, a front face 16*b* of the network device 10 comprises any number of ports 11 (e.g., RJ connector, RJ45 connector, optical module cage, or any other port or opening for receiving a connector or module carrying power, data, optics, or any combination thereof). In one example, the network device 10 is configured as a 1RU (Rack Unit) component with rack mounting brackets 18.

The network device 10 may comprise, for example, a switch with one or more power supply units 12 each comprising an IEC (International Electrotechnical Commission) 60320 C16 input power connector rated for 15 A (amps) and 125/250 VAC, with the power adapter configured for receiving single-phase or multi-phase pulse power at 380 VDC at the power input port and having an IEC 60320 C15 power output connector. As noted below, the power ratings and types of connectors described herein are only provided as examples.

It is to be understood that the network device 10 shown in FIGS. 1A and 1B and described above is only an example and the power adapters 14 described herein may be used to provide power to any type of PSU installed in any type of network device, which may be configured with any number of PSUs installed in any location or arrangement. It is also to be understood that the connectors and power ratings described herein are only examples and other types of connectors with different power ratings or configured in accordance with different standards may be used, without departing from the scope of the embodiments.

It should be noted that while the power adapters (FMP receivers) 14 are described herein for attachment to an existing (conventional, standard) PSU, in one or more embodiments the FMP receivers may replace the PSUs 12 and be configured to receive single-phase or multi-phase pulse power and convert the pulse power directly to regulated VDC (e.g., 48 VDC, 54 VDC) for use by the network device 10. In this case, a power module (comprising the power adapter and PSU) would be inserted into the openings in the chassis in place of the conventional PSUs. For example, the PSU and power adapter may be permanently coupled to define the power module configured for insertion into the device at location 12.

It is to be understood that the terms front and rear as used herein are only relative terms and that the network device may have ports located on any face and the PSU inserted into an opening located on any face. For example, the term "front face" may refer to an exposed or accessible face of a chassis in which ports are typically located, with power connections located on a rear of the chassis. However, the power adapters 14 may be used in other configuration network devices. The arrangement of components within the network device (e.g., location and number of PSUs, location and number of power components), size of network device (e.g., 1RU, 2RU, etc.), and arrangement of components within the PSU (e.g., position of a fan relative to a power connector) may be different than shown herein without departing from the scope of the embodiments.

Figure 2:
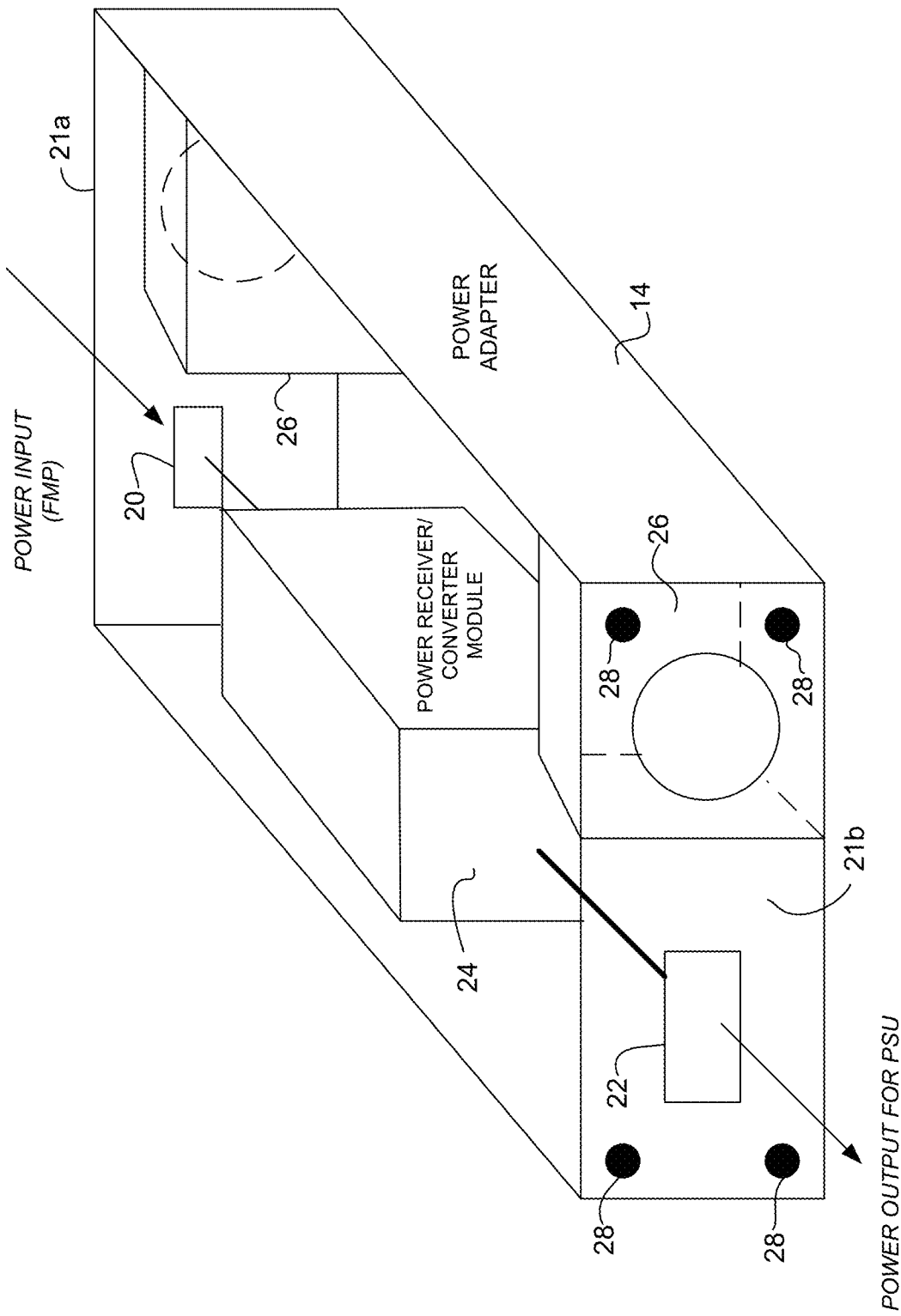
FIG. 2 is a schematic perspective of the power adapter with a top removed to show details, in accordance with one embodiment.

FIG. 2 is a schematic perspective of the power adapter 14 of FIG. 1, with a top portion of the power adapter 14 removed to illustrate details of the power adapter. In one or more embodiments, an apparatus comprises the power adapter 14 configured for direct connection to a power supply unit (as described below with respect to FIG. 3). The power adapter 14 comprises a power input port 20 (e.g., RJ45 connector, modified RJ45 connector, or other suitable connector for receiving power (e.g., FMP)) located on a first end (free end) 21*a* for receiving power on Ethernet cable 15 (as shown in FIG. 1), a power converter module 24 for converting the power received at the power input port 20 to a PSU input power, and a power output connector 22 located on a second end 21*b* for connection with a PSU power input connector. The power input port 20 at the power adapter 14 may be configured for receiving DC pulse power (single-phase or multi-phase), as described below with respect to FIG. 10. The power output connector 22 comprises a PSU compatible connector (e.g., IEC, NEMA, or other suitable connector) for providing output power to the PSU 12 (FIGS. 1A and 2).

The power converter module (power receiver/converter module) 24 is operable to receive fault managed power and convert it to the appropriate PSU input power (e.g., 208 VAC-277 VAC, 240 VAC, 240 VDC, 380 VDC, or other standard PSU voltage input level). In one or more embodiments, the power receiver/converter module 24 may be configured to switch between voltage levels (e.g., 240 VDC or 380 VDC). The term "power converter module" (power receiver module, power receiver/converter module) as used herein refers to any number, type, or arrangement of circuits and components (e.g., modulator, rectifier, filter, fuse, switch, resistor, diode, converter, inverter, etc.) operable to convert the received power (e.g., single-phase or multi-phase DC pulse power, PoE) to a power supply unit input power. Details of the power receiver/converter module 24 are described below with respect to FIGS. 11 and 12.

In one or more embodiments, the power adapter 14 further comprises a fan 26 for providing air flow to a fan inlet at the PSU. In the example shown in FIG. 2, the power adapter 14 comprises two fan assemblies 26 (e.g., fan, fan controller, filter). The fan is powered by power received at the power adapter 14. As described below, the fans 26 may be used to provide cooling air flow to the PSU fan inlet for configurations in which the size of the power adapter 14 blocks an air inlet to the PSU fan. In the example shown in FIG. 2, a first fan 26 located at the first end 21*a* of the power adapter 14 provides cooling for the power converter module 24 and the PSU. A second fan 26 located at the second end 21*b* of the power adapter 14 provides cooling for the PSU.

The power adapter 14 further comprises connectors 28 (clips, fasteners, snaps) for coupling (either removably coupling or permanently coupling) the power adapter to the PSU, as described below with respect to FIG. 3. While the power connection (receptacle 22 at power adapter and plug at PSU) will be able to support some of the weight of the power adapter 14, one or more of the fasteners 28 are provided for additional support, which may be needed based on the weight of the power adapter.

Figure 3:
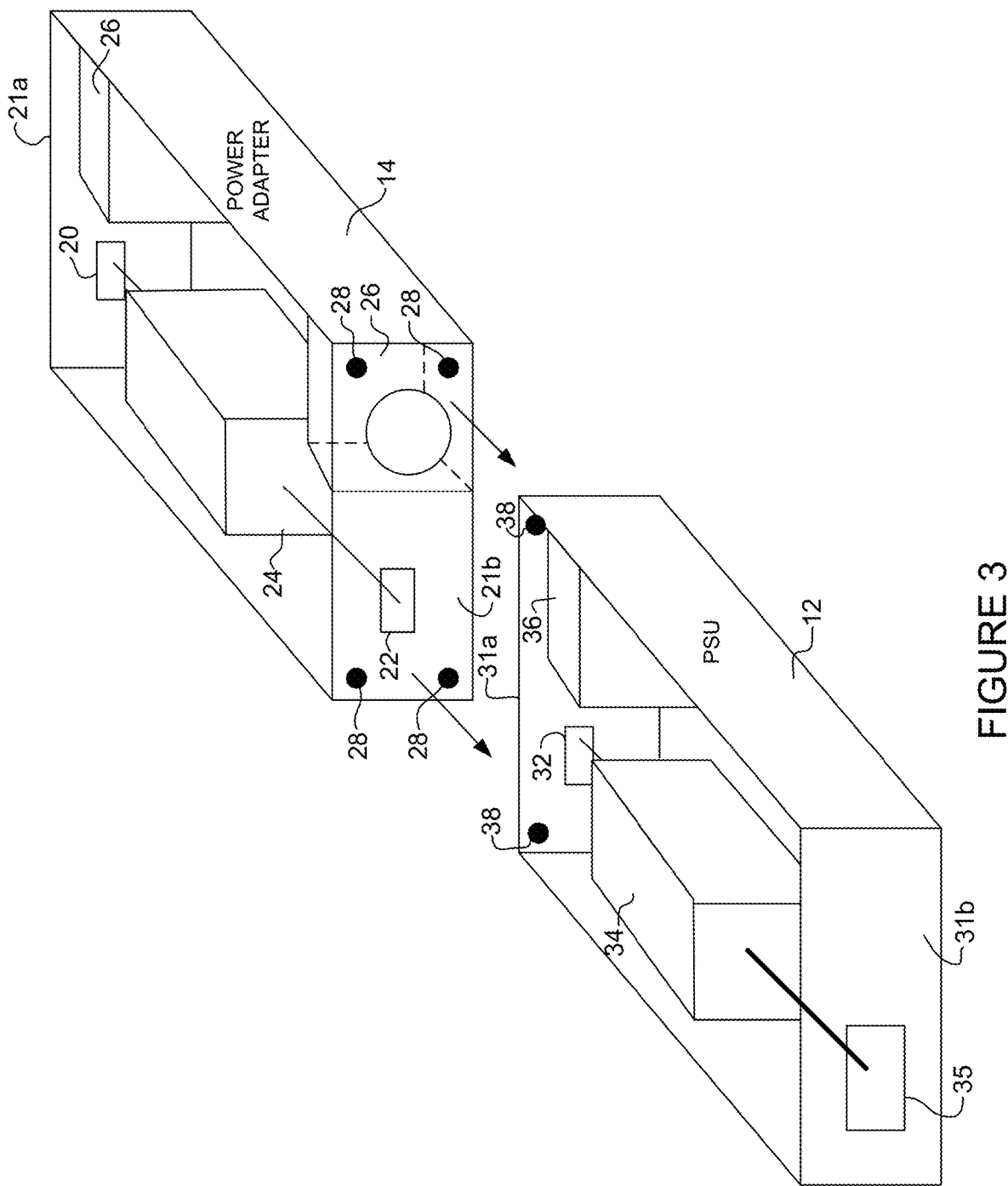
FIG. 3 is a schematic perspective of the power adapter of FIG. 2 aligned for connection with the PSU shown with the top removed to illustrate details.

FIG. 3 shows the power adapter 14 aligned for connection with the PSU 12. In one or more embodiments, an apparatus comprises the PSU 12 comprising a power input connector 32 operable to receive PSU input power and power the network device components 19 when installed in the network device 10, and the power adapter 14 coupled to the PSU and comprising the power input port 20 for receiving power on the Ethernet cable 15, the power converter module 24 for converting the power received at the power input port to the PSU input power, and the power output connector 22 connected to the power input connector 32 of the PSU (FIGS. 1B and 3).

The PSU 12 comprises the power input connector 32 (plug connector, appliance inlet) located on a first end 31a and compatible for mating with the power connector 22 on the power adapter 14. The power connector 32 supplies power to PSU components 34 configured to provide regulated DC output power (e.g., 54 VDC or other suitable voltage level for powering components of the network device) at output 35 on a second end 31b of the PSU. As described above with respect to FIG. 1A, the PSU 12 is inserted into the network device 10 with the first end 31a exposed.

The PSU 12 includes a fan 36, which may receive cooling air flow from the aligned fans 26 at the power adapter 14. The PSU 12 comprises fasteners 38 (clips, connectors, snaps) aligned for mating with the fasteners 28 on the mating face 21b of the power adapter 14. In one or more embodiments, the fasteners 28, 38 comprise snap points with plastic clips configured to hold the power adapter weight, while seamlessly attaching the power adapter 14 to the PSU 12. As previously noted, the power adapter 14 may be removably attached to the PSU 12 or permanently coupled to the PSU.

Figure 4A:
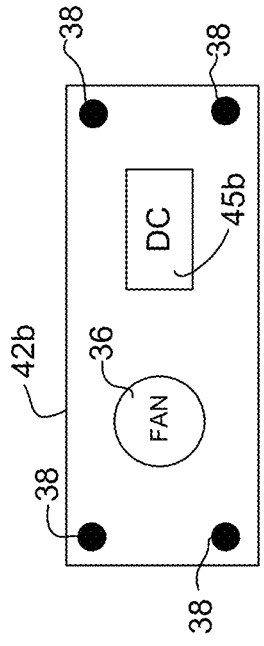
FIG. 4A is a rear view of the PSU of FIG. 3 with an AC (Alternating Current) connector.
Figure 4B:
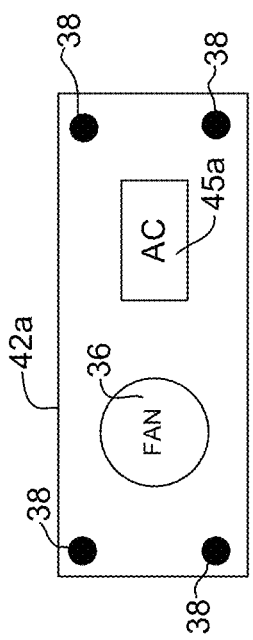
FIG. 4B is rear view of the PSU of FIG. 3 with a DC (Direct Current) connector.

FIGS. 4A and 4B are rear views of a PSU 42a with an AC connector 45a and a PSU 42b with a DC connector 45b, respectively. The AC connector 45a may comprise, for example, an IEC (International Electrotechnical Commission) connector (e.g., IEC 60320/C14, C16, C20), NEMA (National Electrical Manufacturers Association) connector, or another suitable connector operable to receive, for example, 208 VAC to 239 VAC, 208 VAC to 277 VAC, 240 VAC, or other suitable voltage or voltage range. The DC connector 45b may be configured, for example, to receive 240 VDC or 380 VDC. As previously described, the PSU 42a, 42b also includes a fan 36 and any number of power adapter attach points (snap points) 38 for securely connecting the power adapter to the first end 31a (rear) of the PSU (FIGS. 3, 4A, and 4B).

Figure 4C:
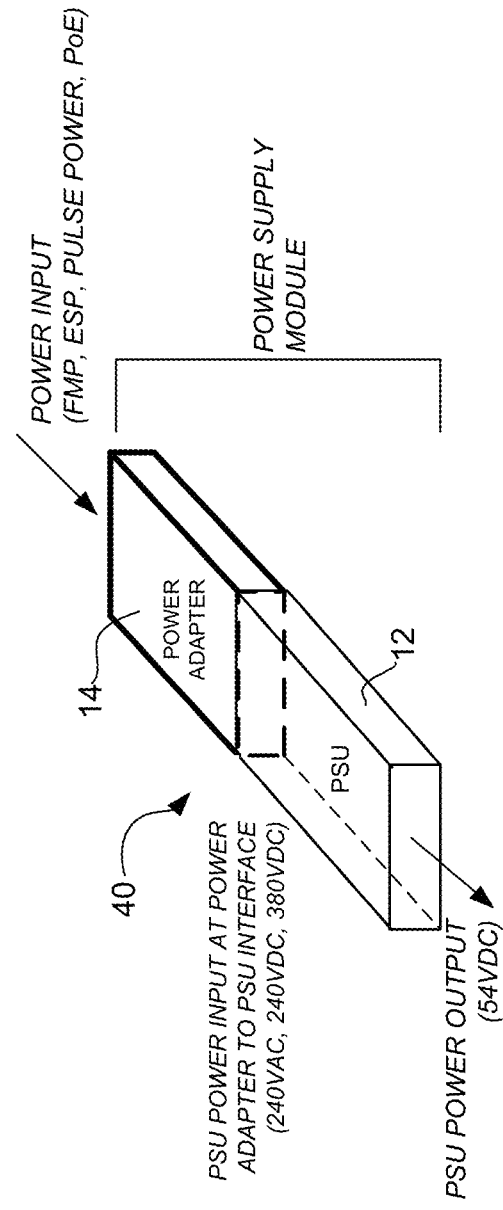
FIG. 4C is a perspective of a power supply module comprising the power adapter and PSU with examples of power input at the power adapter, power at the interface between the power adapter and PSU, and power output at the PSU.

The coupled PSU 12 and power adapter 14 may be referred to herein as a power supply module. FIG. 4C is a perspective of the power supply module 40 comprising the PSU 12 and the power adapter 14, with examples of types of power or voltage levels for power input at the power adapter (power input at power supply module) (e.g., FMP, ESP, pulse power, PoE), power at the interface between the power adapter 14 and PSU 12 (described above with respect to FIGS. 4A and 4B), and power output at the PSU (power output at power supply module) (e.g., 54 VDC).

In one or more embodiments, a permanent attachment may be provided between the PSU 12 and power adapter 14 to avoid hot-swap current/voltage mating/interrupting rating or qualification issues. The power adapter 14 may be permanently attached to the PSU 12 to convert the PSU to a fault managed power system operable to receive FMP/ESP or PoE. The power connector may then be listed under the power supply module, thereby allowing it to carry multiple types of power not normally listed as such, because there is no arc flashing to deal with. For example, the power supply module 40 may be configured to meet all safety requirements in a design for a 380 VDC input through a 250 VAC rated AC connector. The power supply module 40 (PSU 12 and coupled power adapter 14) may be tested and approved as an assembly according to one or more standards. In one or more embodiments, the power supply module 40 may include safety interlock with communications control, as described below.

Figure 5:
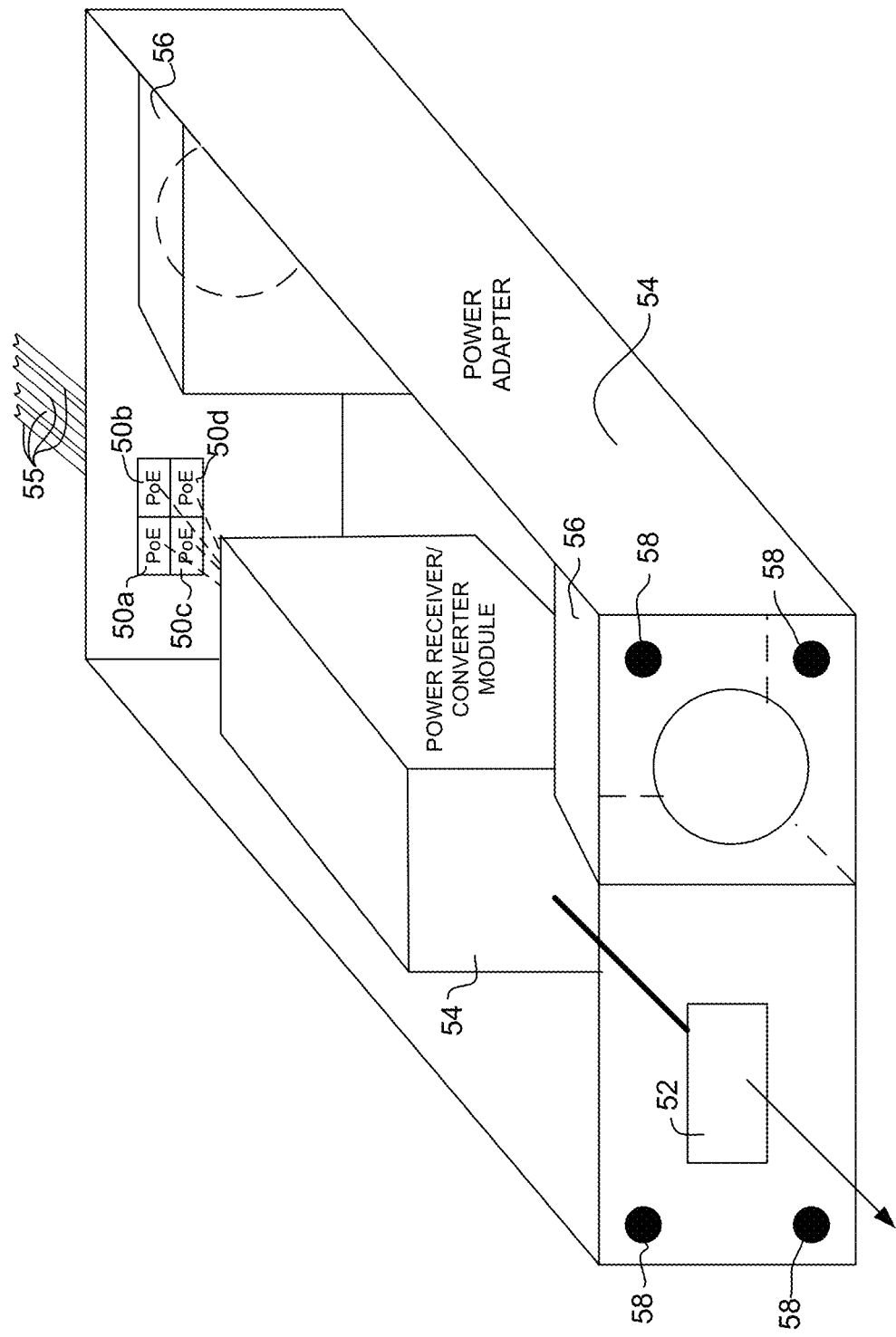
FIG. 5 is a schematic perspective of the power adapter with a plurality of Power over Ethernet (PoE) input ports, in accordance with one embodiment.

FIG. 5 illustrates an example of a power adapter 54 configured for receiving power at a plurality of PoE input ports 50a, 50b, 50c, 50d. The power input port at the power adapter 54 may include any number of PoE ports (e.g., 1-10). Each port may receive power from Ethernet cable 55 (e.g., at RJ45 ports). In one example, each of the four ports 50a, 50b, 50c, 50d is operable to receive 90 W of PoE power for a total input power of 360 W. As previously noted, these power levels are only examples, and the power received at the PD may be less than 90 W (e.g., between 70 W and 90 W depending on the length of the cable). While four individual cables 55 are shown, any number of wire pairs may be bundled together on a single cable. The PoE ports are coupled to the power receiver/converter module 54, which provides power to the PSU at power output connector 52. As previously described, the power adapter 54 may include fans 56 and fasteners 58.

It is to be understood that the power input ports 20, 50a, 50b, 50c, 50d shown in FIGS. 2 and 5 are only examples and that the power adapter may include any number or configuration of ports, which may be configured for receiving single-phase pulse power, multi-phase pulse power, PoE, or any combination thereof and may also be operable to receive both pulse power and PoE (e.g., FMP operable to switch between higher power pulse power and PoE). For example, the port may be configured to receive PoE at startup until safety tests are performed and if no faults are detected, switch to higher power pulse power. During higher power operation, the circuit may be tested (e.g., between high power pulses) and if a fault is detected, power may be switched back to PoE (lower power operation). Testing may be performed as described in U.S. patent application Ser. No. 16/671,508, referenced above, with the power adapter operating as a Powered Device (PD) and the source FMP operating as Power Sourcing Equipment (PSE).

Figure 6:
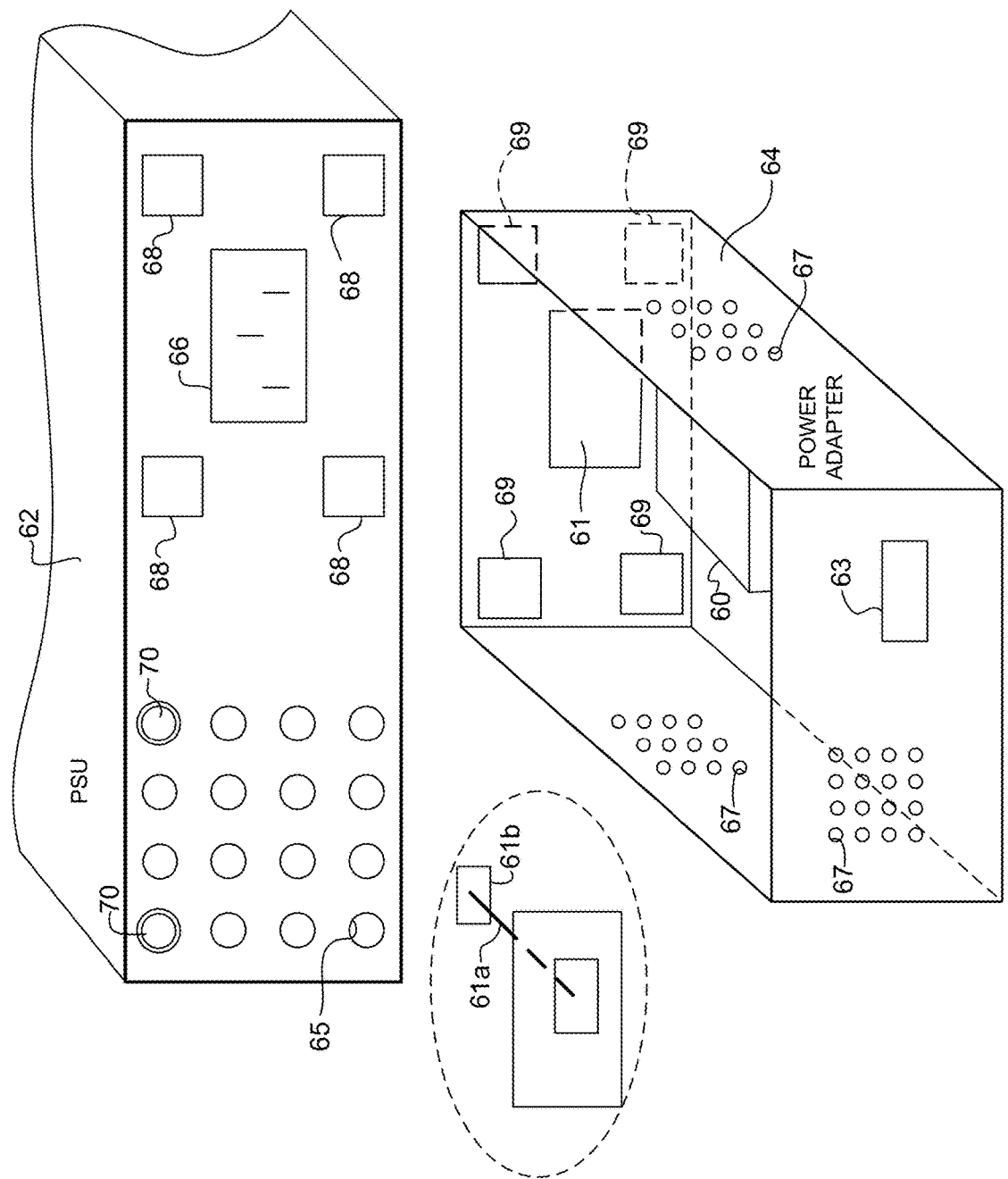
FIG. 6 is a schematic perspective showing a power adapter without fans, aligned for connection with the PSU, in accordance with one embodiment.

FIG. 6 is a schematic perspective with a partial view of a PSU 62 and a power adapter 64 aligned for connection with the PSU. In this example, the power adapter 64 has a width generally corresponding to a power portion of the PSU and does not cover the fan inlet (air openings 65), thus, there is no need for a fan in the power adapter. The power adapter 64 includes a power input port 63, power converter 60, and power output connector 61 for connection to power input connector 66 on the PSU 62, as previously described. The power adapter 64 may include any number of air inlet openings 67 located on one or more walls of the power adapter. The PSU 62 includes one or more connection points 68 for mating with connection points 69 on the power adapter 64.

In one example, the connector 61 may comprise a cable 61a having an end 61b configured to mate with the PSU power input connector 66, as shown in the alternate cutout view of FIG. 6.

Figure 7:
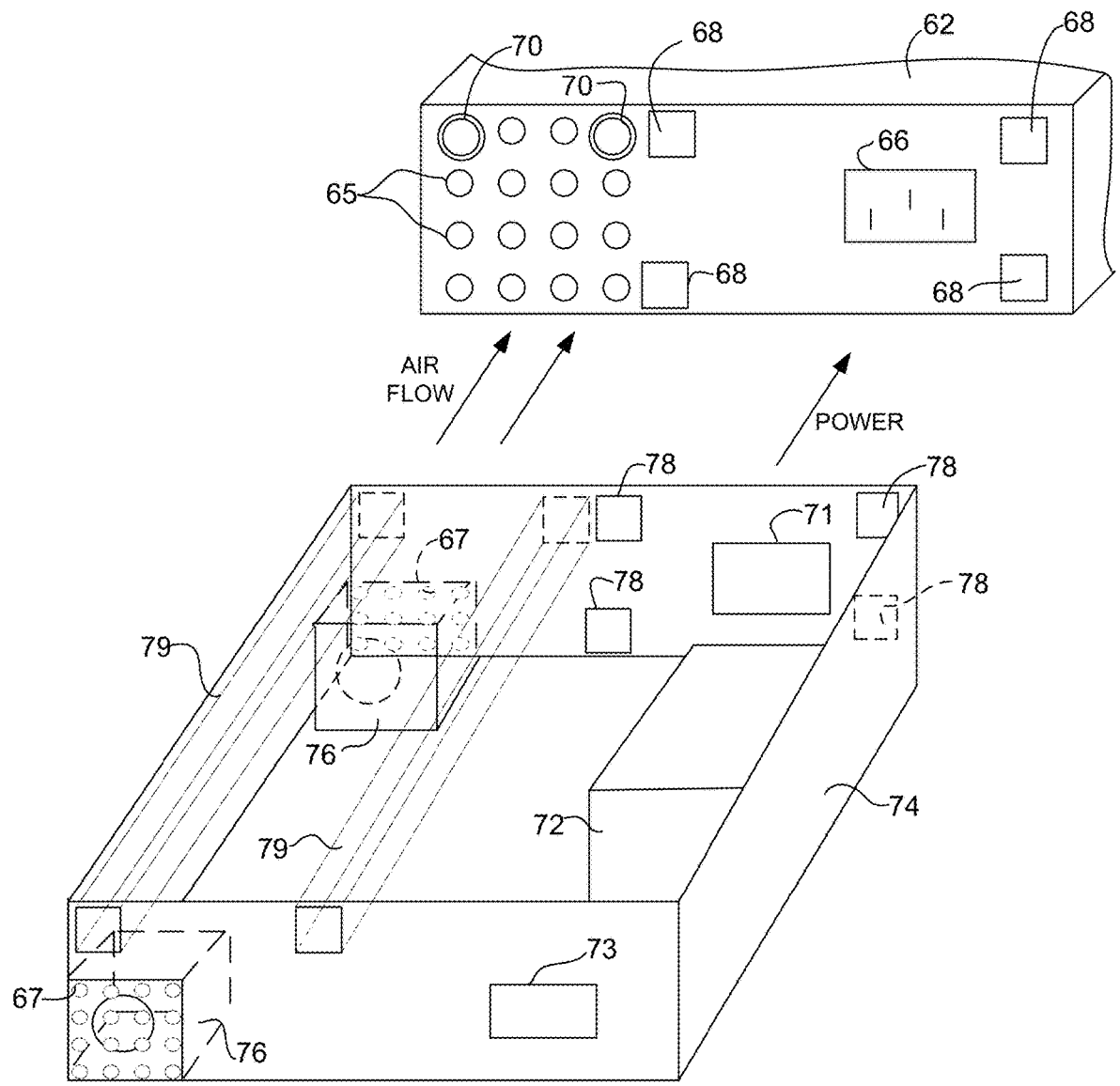
FIG. 7 is a schematic perspective of a power adapter with fans, aligned for connection with the PSU, in accordance with one embodiment.
Figure 8:
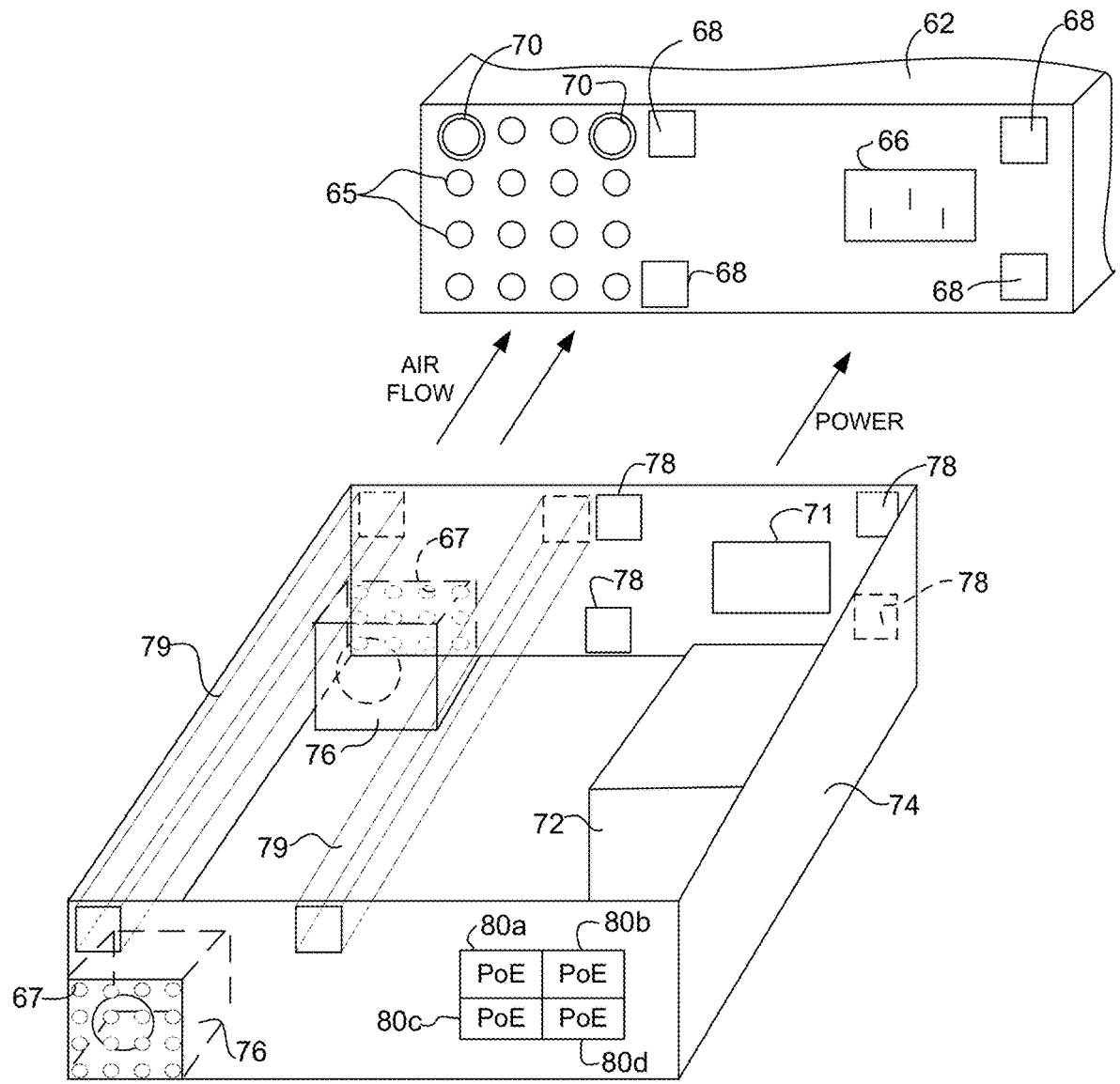
FIG. 8 is a schematic perspective of the power adapter of FIG. 7 with PoE input ports, in accordance with one embodiment.

FIGS. 7 and 8 illustrate a power adapter 74 having a width generally corresponding to a width of the PSU 62. As previously described with respect to FIGS. 2 and 5, the power adapter 74 comprises a power input port (e.g., FMP input port 73 shown in FIG. 7 or a plurality of PoE ports 80a, 80b, 80c, 80d as shown in FIG. 8) and power output port 71 for a power connection with power input connector 66 on the PSU 62. The power receiver converter module 72 converts the power received at the power input port to the PSU input power, as described above. The power adapter 74 includes fans 76 for providing cooling airflow to the air inlet openings 65 at PSU 62. Air inlet openings 67 may be positioned adjacent to the fan assemblies 76 and a filter (not shown) may also be positioned to filter air at the fan inlet.

In the examples shown in FIGS. 6-8, the PSU 62 includes status lights 70 (e.g., bicolor (green/red) LED (Light Emitting Diodes)) to indicate a status of the power supply and fan (e.g., input voltage status, output voltage status, fan status). The power adapter 74 includes light pipes 79 for transmitting light emitted from the status lights 70 on the PSU 62 to the free end of the power adapter 74 so that the LED status light can be viewed at the rear face (free end) of the power adapter. The power adapter 74 may include any number of light pipes 79 (e.g., one or more) aligned with one or more status lights 70 on the rear face of the PSU 62.

Figure 9A:
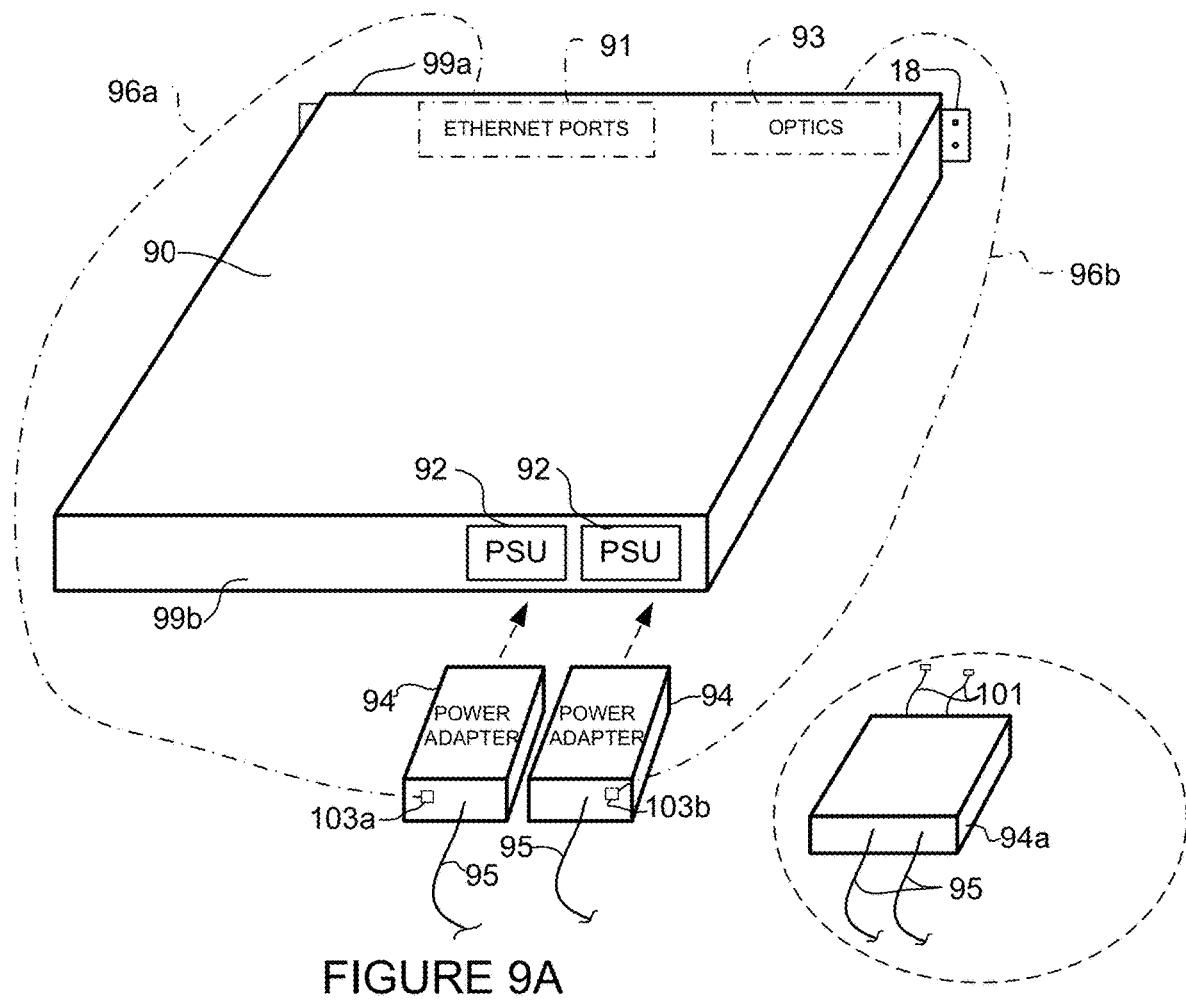
FIG. 9A is a rear perspective of the network device and power adapters.

FIG. 9A is a rear perspective of power adapters 94 aligned for connection with PSUs 92 at network device 90, in accordance with another embodiment. A front face (first face) 99a of the network device 90 includes a plurality of ports, including for example, Ethernet ports 91 (e.g., downlink ports), optical module ports 93 for receiving optical modules (e.g., uplink modules, optical transceivers) or any combination, number or arrangement of ports. As noted above, the front face 99a of the network device 90 may include rack mounting brackets 18. The PSU input power connectors are located on a rear face (second face) 99b of the network device). As previously described, power is received on cables 95. In one or more embodiments, the cable 95 may be configured for transmitting power, power and data, power and optics, or any combination thereof. In one example, the cable 95 may comprise a hybrid cable including copper wires and one or more optical fibers. In one or more embodiments, the power adapter 94 may be configured to transmit one or more of data on cable 96a to Ethernet ports 91 or optics on cable 96b to optical ports located on the front face 99a of the network device 90. The power adapter 94 may include, for example, one or more Ethernet ports 103a (e.g., RJ connector) or optical ports 103b (e.g., LC connector) for attachment to the cables 96a, 96b, respectively.

In one or more embodiments, the power adapter 94 may comprise an optical transceiver (optical module, optical device, optics module, network transceiver, silicon photonics optical transceiver, pluggable transceiver module) configured to receive power, as described in U.S. Pat. No. 10,541,758 ("Power Delivery Through an Optical System"), issued Jan. 21, 2020, which is incorporated herein by reference in its entirety. The power received at the optical transceiver is transmitted to the power converter module for delivery to the PSU 92. The data or power and data (e.g., PoE) may be delivered on cable 96a to one or more of the Ethernet ports 91 and optics may be delivered over one or more optical fibers on cable 96b to the optical module 93.

As previously noted, the power adapter may also be configured to receive power from one or more cables 95 and transmit PSU input power to more than one PSU 92. In one example shown in the cutout view of FIG. 9A, a power adapter 94a receives input power (FMP, PoE) on two cables 95 and transmits power to two PSUs through AC power cords 101. The power adapter 94a may be configured with any number of power input ports and any number of power output connectors, which may be configured for direct connection to the PSUs 92 or connection through the AC cables (cords) 101. Also, as previously described, the power adapter 94a may comprise one or more data output ports.

Figure 9B:
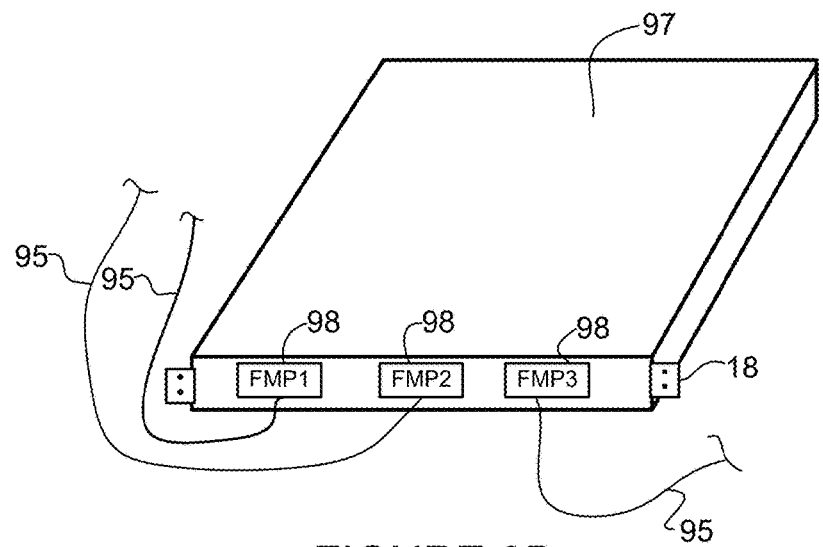
FIG. 9B is a front perspective of a source FMP (Fault Managed Power) device for transmitting power to the power adapters of FIG. 9A.

FIG. 9B illustrates an example of a source FMP device 97, in accordance with one embodiment. In this example, the source FMP device 97 comprises three transmitters 98 (FMP1, FMP2, FMP3) for transmitting power to one or more power adapters 94 on cables 95 (FIGS. 9A and 9B). Each FMP transmitter 98 may comprise an IDC (Insulation-Displacement Contact) connector and may deliver single-phase or multi-phase pulse power, as described above. The transmitter output may be, for example, 380 VDC/+190 reference to ground. In one example, the system may be operable to drive 2000 W over 2000 meters with two-phase or three-phase pulse power and safety interlocks (e.g., fault testing as described in U.S. patent application Ser. No. 16/671,508, referenced above). In another example, each FMP transmitter 98 may transmit 4000 W for delivery of 12000 W. Each FMP transmitter 98 is powered by a power supply unit (not shown) at the source transmitter 97. The source transmitter 97 may be configured for installation in a rack (e.g., 1RU format) and comprise rack mounting brackets 18. It is to be understood that the source transmitter device 97 shown in FIG. 9B is only an example and the source network device may comprise any number of transmitters 98 configured to transmit any suitable power at any suitable voltage.

Figure 10:
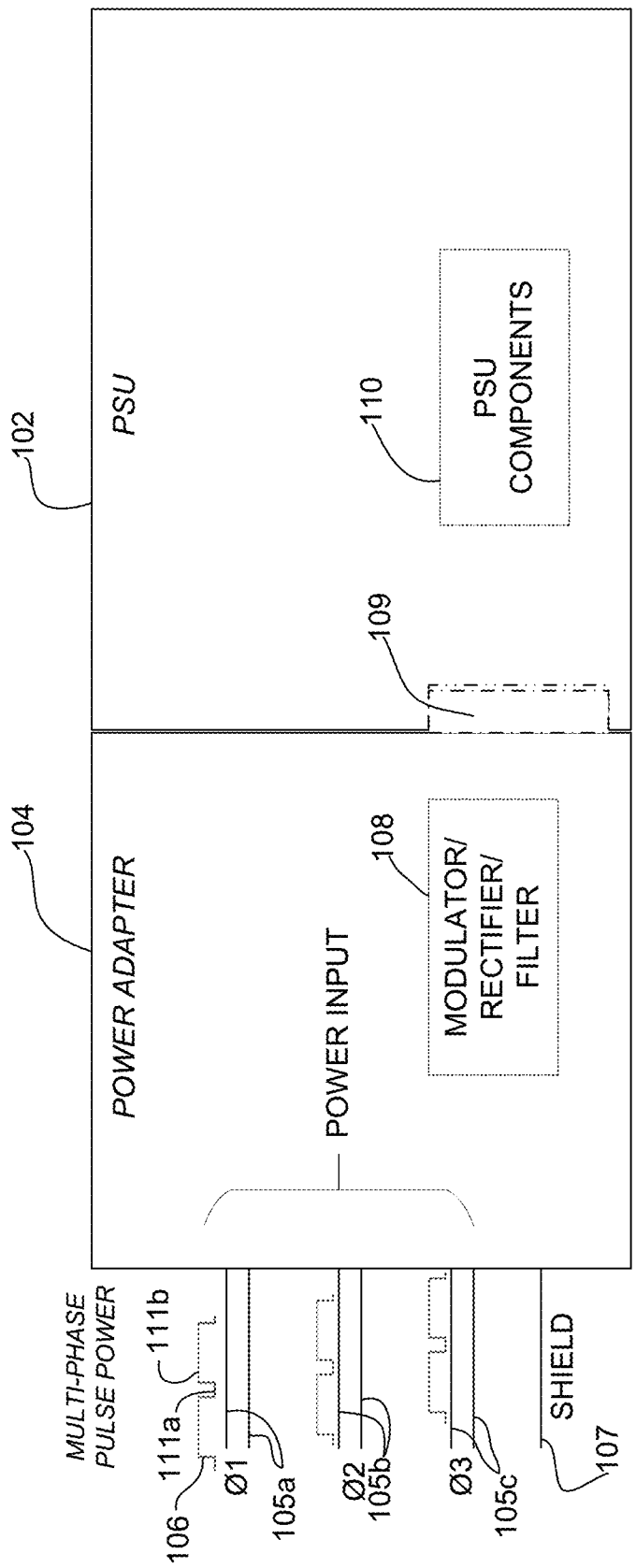
FIG. 10 is a side view of the power adapter and PSU with multi-phase pulse power input, in accordance with one embodiment.

FIG. 10 is a side view of a PSU 102 and power adapter 104, in accordance with one embodiment. In this example, the power adapter 104 receives three-phase DC pulse power (phase 1 on wire pair 105a, phase 2 on wire pair 105b, phase 3 on wire pair 105c). As previously noted, pulse power refers to power that is delivered in a plurality of voltage pulses (sequence of voltage pulses) 106 in which voltage varies between a very small voltage during a pulse-off time 111a and a larger voltage during a pulse-on time 111b. It is to be understood that this is a simplified voltage pulse from a perspective of the power output. The voltage during the pulse-off time of a cable capacitance droop voltage may be, for example, about 2-10% from a high voltage level with normal operation <100 kOhm resistance with no-fault, or a worst case body resistance fault of 350-Ohms for a cable capacitance droop voltage to zero. High voltage pulse power (high voltage pulses) (e.g., >56V, >60V, >300V) may be transmitted from power sourcing equipment (PSE) to a powered device (PD) for use in powering the powered device, whereas low voltage pulse power (low voltage pulses) (e.g., —12V, —24V, <30V, <56V) may be used over a short interval for start-up (e.g., initialization, synchronization, charging local energy storage, powering up a controller, testing, or any combination thereof). As shown in FIG. 10, the pulse power may be delivered in multiple phases, with the pulses offset from one another between phases to provide continuous power.

The cable may also include a shield wire 107. The power adapter 104 comprises a modulator/rectifier/filter 108 for converting the multi-phase pulse power to PSU input power. The PSU input power is delivered at power connection 109

(e.g., IEC C13/C14, IEC C15/C16, IEC C19/C20, or other suitable connectors) to the PSU 102. The PSU 102 comprises electrical components (PSU components) 110, as well known by those skilled in the art. In one example, the PSU 102 is configured to receive 1000-3000 watts power at 200-277 VAC. As previously noted, the voltage and power levels described herein are provided only as examples.

Figure 11:
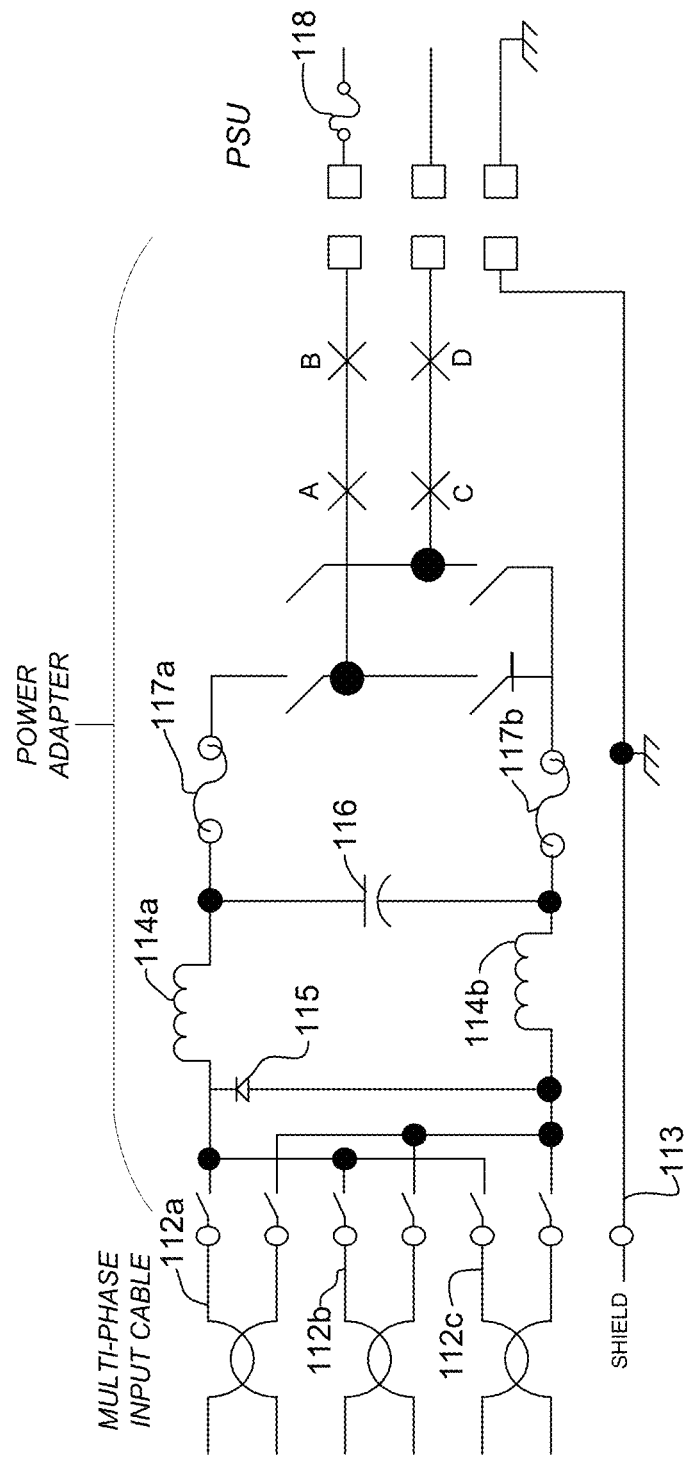
FIG. 11 is an electrical schematic illustrating an input cable, the power adapter, and PSU, in accordance with one embodiment.

FIG. 11 shows a simplified example of a circuit at the power adapter, in accordance with one embodiment. In this example, a multi-phase input cable provides power on three twisted pairs 112a, 112b, 112c. A shield wire 113 may also be provided. The power adapter circuit shown in the example of FIG. 11 includes a rectifier/filter with inductors 114a, 114b, diode 115, capacitor 116, and fuses 117a, 117b. In this example, the PSU also includes a fuse 118. In one example, 600 VDC rated input fuses 117a, 117b may be provided to both sides of the midpoint grounded multi-phase pulse power input after the rectifier/filter to a voltage inverter stage to provide a rectangular waveform for an equivalent AC waveform to the 250 VAC rated connector to meet voltage and current ratings. The PSU may be rated, for example, from 200-240 VAC with no DC overcurrent protection. In one or more embodiments, the power adapter may be configured with DC voltage overcurrent protection for the DC input voltage at the power adapter with current interrupting capacity to prevent damage to the PSU. The DC fuses 117a, 117b (e.g., rated for 400-600 VDC) on each side of the mid-point grounded filtered DC power line from the multi-phase pulse power input power cable pairs may be used to provide the overcurrent protection.

In one or more embodiments, a sinewave or quasi-sine output inverter may be included for lower EMI (Electromagnetic Interference) and slower zero crossing. In one or more embodiments, firmware in the PSU may be programmed to reject DC input and require a rectangular-wave or sinewave type signature of a frequency and zero crossing slew rate or specified dv/dt slew rate. In one or more embodiments the PSU is configured to verify that the PSU input power comprises a voltage waveform comprising a specified frequency signature. For example, PSU logic (e.g., software, firmware, hardware) may be used to verify that an input voltage waveform has a specific signature of frequency and zero-crossing di/dt before allowing operation.

Figure 12:
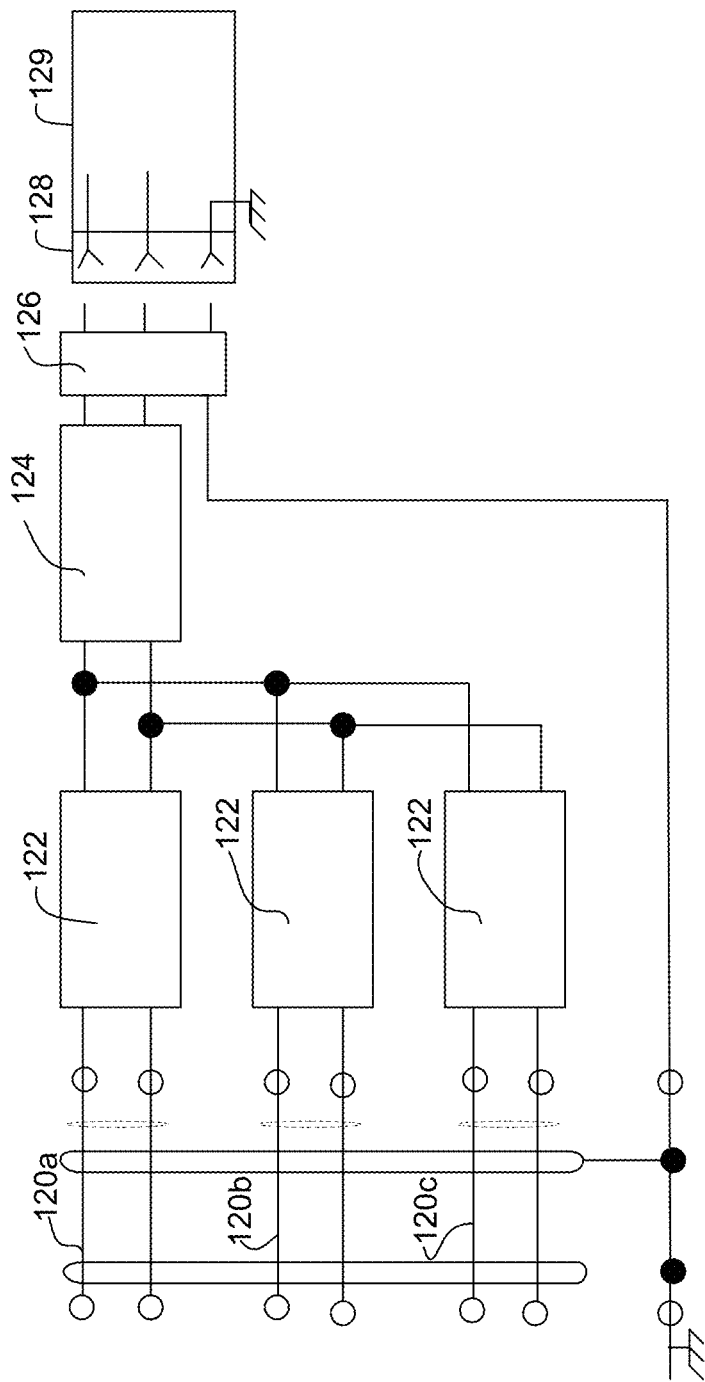
FIG. 12 is a schematic illustrating components of the power adapter, in accordance with one embodiment.

FIG. 12 illustrates three wire pairs 120a, 120b, 120c each coupled to a modulator/rectifier/filter 122. The modulator/rectifier/filters 122 connect to a DC to AC converter 124 coupled to a power adapter output connector 126 configured to mate with PSU input connector 128 at PSU 129, which includes a power regulator. The DC/AC converter/inverter 124 may be positioned between the DC input power and the power output connector 126 that mates to the PSU connector 128 to meet a maximum VAC input power connector rating. The converter/inverter 124 may provide, for example, an AC voltage not to exceed a 250 VAC RMS (Root Mean Square) voltage rating of the connectors. This may be provided with a maximum peak voltage of +/−350V of a bipolar quasi-square wave that produces 250 VAC RMS maximum. In one or more embodiments, a connector interlock may be included that prevents current flowing during mating or uncoupling of a hot-plugin between the power adapter and the PSU connectors 126, 128. This may also be used to interrupt the output voltage for added touch-safety.

Power adapters as shown in FIGS. 9A, 9B, 10, 11, and 12 show direct connections to the PSU power input connectors. As previously noted and shown in the cutout view of FIG. 9A, FMP input power (on one or more cables 95) may be provided directly to the power adapter 94a with output power to multiple AC power output connectors that connect to the PSU power input connectors through AC power cables (cords) 101 (e.g., configured to meet voltage and current ratings for a 250 VAC connector). The power adapter 94a may include a high power rectifier/filter/fuse and inverter circuit with an AC waveform as described above with respect to FIGS. 11 and 12.

Figure 13:
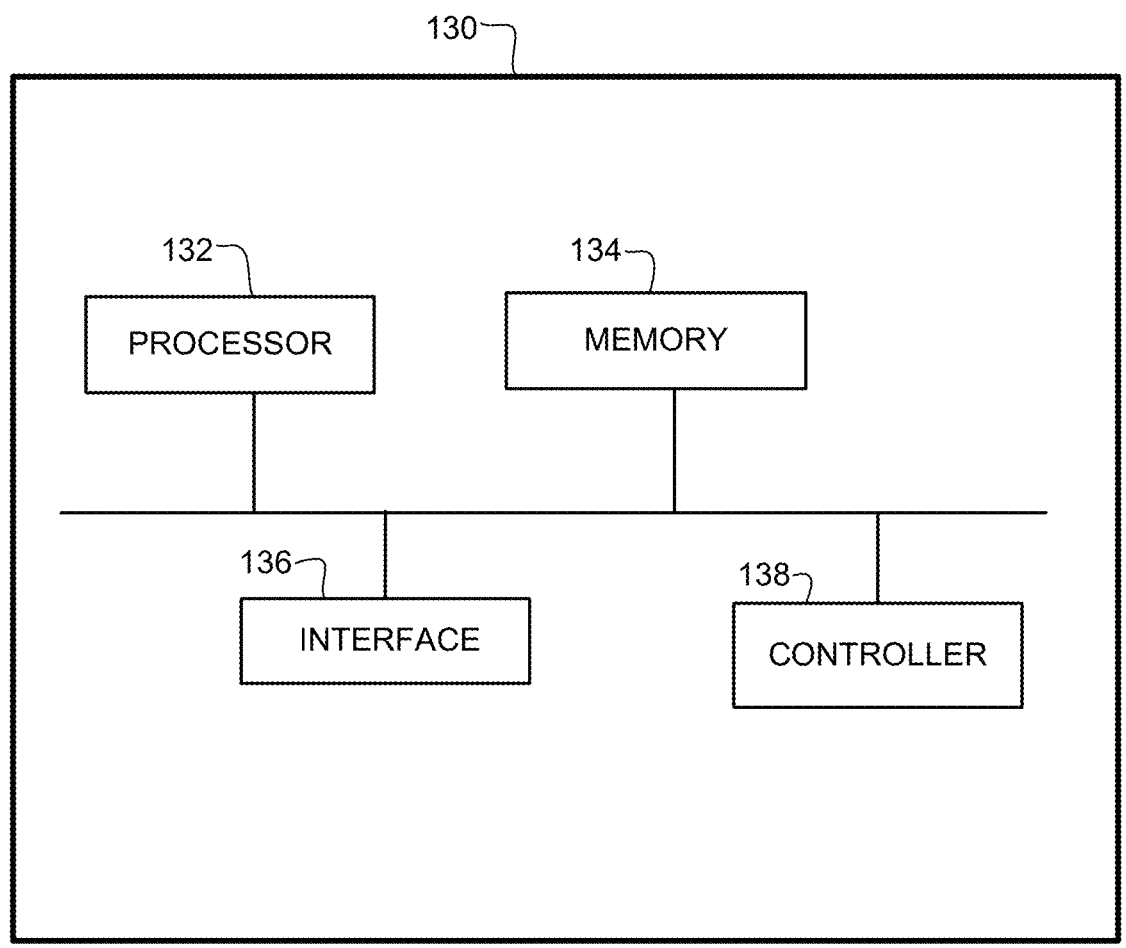
FIG. 13 is a block diagram depicting an example of a network device in which the embodiments described herein may be implemented.

FIG. 13 illustrates an example of a network device 130 that may implement one or more embodiments described herein. In one or more embodiments, the network device is a programmable machine that may be implemented in hardware, software, or any combination thereof. The network device includes one or more processor 132, memory 134, interface 136, and controller (e.g., PSU controller, fan controller, controller at power adapter) 138.

Memory 134 may be a volatile memory or non-volatile storage, which stores various applications, operating systems, modules, and data for execution and use by the processor 132. The network device 130 may include any number of memory components.

Logic may be encoded in one or more tangible media for execution by the processor 132. For example, the processor 132 may execute codes stored in a computer-readable medium such as memory 134. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. The network device 130 may include any number of processors 132.

The interface 136 may comprise any number of network interfaces (line cards, ports) for receiving data or transmitting data to other devices or power interfaces (e.g., power interface at PSU for connecting with power adapter).

It is to be understood that the network device 130 shown in FIG. 13 and described above is only an example and that different configurations of network devices may be used. For example, the network device may further include any suitable combination of hardware, software, algorithms, processors, devices, components, or elements operable to facilitate the capabilities described herein.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. An apparatus comprising:
 a power adapter configured for direct connection to a Power Supply Unit (PSU) installed in a network device, the power adapter comprising:
 a power input port for receiving power on an Ethernet cable;
 a power converter module for converting the power received at the power input port to a PSU input power;
 a power output connector for connection with a PSU power input connector; and
 a fan for providing air flow to a fan inlet at the PSU.

2. The apparatus of claim 1, wherein the power input port is configured for receiving pulse power.

3. The apparatus of claim 1, wherein the power input port comprises a plurality of ports configured for receiving Power over Ethernet (PoE).

4. The apparatus of claim 1, wherein the power input port is located at a first end of the power adapter and the power output connector is located on a second end of the power adapter and wherein the second end of the power adapter comprises at least one connection point for attaching the power adapter to the PSU.

5. The apparatus of claim 1 wherein the power adapter comprises a light pipe for transmitting light emitted from a status light on the PSU to a free end of the power adapter.

6. The apparatus of claim 1, wherein the PSU input power comprises one of 240 VAC (Volts Alternating Current), 240 VDC (Volts Direct Current), or 380 VDC.

7. The apparatus of claim 1, wherein the power received comprises DC (Direct Current) power and the PSU input power comprises AC (Alternating Current) power and wherein the PSU is operable to deliver regulated DC power for powering power components at the network device.

8. The apparatus of claim 1, wherein the power output connector at the power adapter comprises an IEC (International Electrotechnical Commission) standard connector.

9. An apparatus comprising:
a Power Supply Unit (PSU) comprising a power input connector operable to receive a PSU input power and power network device components when installed in a network device, wherein the PSU is configured to verify that the PSU input power comprises a specific frequency and waveshape signature; and
a power adapter coupled to the PSU and comprising a power input port for receiving power on an Ethernet cable, a power converter module for converting the power received at the power input port to the PSU input power, and a power output connector connected to the power input connector of the PSU.

10. The apparatus of claim 9, wherein the power input port is configured for receiving one or more of single phase DC (Direct Current) pulse power, multi-phase DC pulse power, or Power over Ethernet (PoE).

11. The apparatus of claim 9, wherein the power adapter comprises a fan for providing air flow to a fan inlet at the PSU.

12. The apparatus of claim 9, wherein the power adapter and the PSU are only hot-swappable on the network device in a coupled configuration.

13. The apparatus of claim 9, wherein the PSU comprises a status light and the power adapter comprises a light pipe for transmitting light emitted from the status light to a free end of the power adapter.

14. The apparatus of claim 9, wherein the power received at the power adapter comprises DC (Direct Current) power and the PSU input power comprises AC (Alternating Current) power and wherein the power adapter comprises at least one DC fuse for overcurrent protection.

15. The apparatus of claim 9, wherein the power received at the power adapter comprises multi-phase DC (Direct Current) pulse power, the PSU input power comprises AC (Alternating Current) power, and the PSU is operable to deliver regulated DC power for powering the network device components and wherein the power adapter comprises a power modulator for each phase of the multi-phase DC pulse power and a DC to AC converter downstream of the power modulator.

16. A network device comprising:
a Power Supply Unit (PSU) comprising a power input connector operable to receive a PSU input power and power one or more components of the network device;
a fan for providing air flow to a fan inlet at the PSU; and
a power adapter coupled to the PSU and comprising a power input port for receiving DC (Direct Current) pulse power, a power converter module for converting the DC pulse power to the PSU input power, and a power output connector connected to the power input connector of the PSU,
wherein the PSU and power adapter are permanently coupled to define a power module configured for insertion into the network device and wherein the power output connector of the power adapter and the power input connector of the PSU define an internal connection at the power module.

17. The network device of claim 16, wherein the network device comprises a switch comprising two power supply units and two power adapters connected to the power supply units.

18. The network device of claim 16, wherein the network device comprises two power supply units and wherein the power adapter comprises two power output connectors for connection with two power input connectors at the two power supply units.

19. The network device of claim 16, wherein the power input port is located at a first end of the power adapter and the power output connector is located on a second end of the power adapter and wherein the second end of the power adapter comprises a plurality of fasteners for attaching the power adapter directly to the PSU.

20. The network device of claim 16, wherein the power input port at the power adapter is operable to receive multi-phase DC pulse power.

21. An apparatus comprising:
a power adapter configured for powering a Power Supply Unit (PSU) installed in a network device, the power adapter comprising:
a power input port for receiving DC (Direct Current) pulse power on a cable;
a power converter module for converting the DC pulse power to a PSU input power;
a power output connector for electrical connection with a PSU power input connector; and
a fan for providing air flow to a fan inlet at the PSU.

22. The apparatus of claim 21, wherein the power input port comprises a plurality of ports configured for receiving Power over Ethernet (PoE).

23. The apparatus of claim 21, wherein the power input port is configured for receiving multi-phase DC pulse power, the PSU input power comprises AC (Alternating Current) power, and the PSU is operable to deliver regulated DC power for powering network device components.

24. The apparatus of claim 21, wherein the power output connector comprises an AC (Alternating Current) power cable.

* * * * *